US009363078B2

(12) United States Patent
Taylor et al.

(10) Patent No.: US 9,363,078 B2
(45) Date of Patent: Jun. 7, 2016

(54) METHOD AND APPARATUS FOR HARDWARE-ACCELERATED ENCRYPTION/DECRYPTION

(71) Applicant: IP Reservoir, LLC, St. Louis, MO (US)

(72) Inventors: David E. Taylor, St. Louis, MO (US); Brandon Parks Thurmon, St. Louis, MO (US); Ronald S. Indeck, St. Louis, MO (US)

(73) Assignee: IP Reservoir, LLC, St. Louis, MO (US)

( * ) Notice: Subject to any disclaimer, the term of this patent is extended or adjusted under 35 U.S.C. 154(b) by 0 days.

(21) Appl. No.: 14/510,315

(22) Filed: Oct. 9, 2014

(65) Prior Publication Data

US 2015/0023501 A1    Jan. 22, 2015

Related U.S. Application Data

(62) Division of application No. 12/201,259, filed on Aug. 29, 2008, now Pat. No. 8,879,727.

(60) Provisional application No. 60/969,384, filed on Aug. 31, 2007.

(51) Int. Cl.
*H04L 9/08*    (2006.01)
*H04L 9/00*    (2006.01)
*H04L 9/06*    (2006.01)

(52) U.S. Cl.
CPC ............ *H04L 9/0861* (2013.01); *H04L 9/0618* (2013.01); *H04L 9/0819* (2013.01); *H04L 9/0822* (2013.01); *H04L 9/0844* (2013.01); *H04L 2209/122* (2013.01); *H04L 2209/125* (2013.01); *H04L 2209/24* (2013.01)

(58) Field of Classification Search
CPC ... H04L 9/0861; H04L 9/0819; H04L 9/0822; H04L 9/0844; H04L 9/0618; H04L 2209/24; H04L 2209/122; H04L 2209/125
See application file for complete search history.

(56) References Cited

U.S. PATENT DOCUMENTS 4,300,193 A    11/1981    Bradley et al.
5,243,655 A    9/1993    Wang
(Continued)

FOREIGN PATENT DOCUMENTS

EP    0880088    11/1996
EP    0851358 A    7/1998
(Continued)

OTHER PUBLICATIONS

Ramakrishna et al., "A Performance Study of Hashing Functions for Hardware Applications", Int. Conf. on Computing and Information, May 1994, pp. 1621-1636, vol. 1, No. 1.
(Continued)

*Primary Examiner* — Darren B Schwartz
(74) *Attorney, Agent, or Firm* — Thompson Coburn LLP; Benjamin L. Volk, Jr.

(57) ABSTRACT

An integrated circuit for data encryption/decryption and secure key management is disclosed. The integrated circuit may be used in conjunction with other integrated circuits, processors, and software to construct a wide variety of secure data processing, storage, and communication systems. An embodiment of the integrated circuit includes a run-time scalable block cipher circuit, wherein the run-time scalable block cipher circuit is run-time scalable to balance throughput with power consumption.

41 Claims, 30 Drawing Sheets

(56) References Cited

U.S. PATENT DOCUMENTS

| | | | |
|---|---|---|---|
| 5,249,292 A | 9/1993 | Chiappa | |
| 5,371,794 A | 12/1994 | Diffie et al. | |
| 5,432,822 A | 7/1995 | Kaewell, Jr. | |
| 5,461,712 A | 10/1995 | Chelstowski et al. | |
| 5,481,735 A | 1/1996 | Mortensen et al. | |
| 5,619,574 A | 4/1997 | Johnson et al. | |
| 5,701,464 A | 12/1997 | Aucsmith | |
| 5,704,060 A | 12/1997 | Del Monte | |
| 5,740,249 A | 4/1998 | Shimizu et al. | |
| 5,805,832 A | 9/1998 | Brown et al. | |
| 5,813,000 A | 9/1998 | Furlani | |
| 5,909,494 A * | 6/1999 | Blaze | 380/37 |
| 5,943,421 A | 8/1999 | Grabon | |
| 5,991,881 A | 11/1999 | Conklin et al. | |
| 6,023,760 A | 2/2000 | Karttunen | |
| 6,028,939 A | 2/2000 | Yin | |
| 6,044,375 A | 3/2000 | Shmueli et al. | |
| 6,044,407 A | 3/2000 | Jones et al. | |
| 6,064,739 A | 5/2000 | Davis | |
| 6,067,569 A | 5/2000 | Khaki et al. | |
| 6,073,160 A | 6/2000 | Grantham et al. | |
| 6,084,584 A | 7/2000 | Nahi et al. | |
| 6,105,067 A | 8/2000 | Batra | |
| 6,134,551 A | 10/2000 | Aucsmith | |
| RE36,946 E | 11/2000 | Diffie et al. | |
| 6,147,890 A | 11/2000 | Kawana et al. | |
| 6,147,976 A | 11/2000 | Shand et al. | |
| 6,169,969 B1 | 1/2001 | Cohen | |
| 6,185,531 B1 | 2/2001 | Schwartz et al. | |
| 6,195,024 B1 | 2/2001 | Fallon | |
| 6,226,676 B1 | 5/2001 | Crump et al. | |
| 6,279,113 B1 | 8/2001 | Vaidya | |
| 6,307,936 B1 | 10/2001 | Ober et al. | |
| 6,309,424 B1 | 10/2001 | Fallon | |
| 6,317,795 B1 | 11/2001 | Malkin et al. | |
| 6,377,942 B1 | 4/2002 | Hinsley et al. | |
| 6,397,259 B1 | 5/2002 | Lincke et al. | |
| 6,397,335 B1 | 5/2002 | Franczek et al. | |
| 6,412,000 B1 | 6/2002 | Riddle et al. | |
| 6,430,272 B1 | 8/2002 | Maruyama et al. | |
| 6,442,545 B1 | 8/2002 | Feldman et al. | |
| 6,463,474 B1 | 10/2002 | Fuh et al. | |
| 6,499,107 B1 | 12/2002 | Gleichauf et al. | |
| 6,578,147 B1 | 6/2003 | Shanklin et al. | |
| 6,597,812 B1 | 7/2003 | Fallon et al. | |
| 6,601,104 B1 | 7/2003 | Fallon | |
| 6,604,158 B1 | 8/2003 | Fallon | |
| 6,624,761 B2 | 9/2003 | Fallon | |
| 6,625,150 B1 | 9/2003 | Yu | |
| 6,633,868 B1 | 10/2003 | Min et al. | |
| 6,658,377 B1 | 12/2003 | Anward et al. | |
| 6,658,423 B1 | 12/2003 | Pugh et al. | |
| 6,704,816 B1 | 3/2004 | Burke | |
| 6,711,558 B1 | 3/2004 | Indeck et al. | |
| 6,760,439 B1 | 7/2004 | Windirsch | |
| 6,765,918 B1 | 7/2004 | Dixon et al. | |
| 6,772,170 B2 | 8/2004 | Pennock et al. | |
| 6,772,345 B1 | 8/2004 | Shetty | |
| 6,782,394 B1 | 8/2004 | Landeck et al. | |
| 6,804,667 B1 | 10/2004 | Martin | |
| 6,807,156 B1 | 10/2004 | Veres et al. | |
| 6,870,929 B1 | 3/2005 | Greene | |
| 6,882,747 B2 | 4/2005 | Thawonmas et al. | |
| 6,886,103 B1 | 4/2005 | Brustoloni et al. | |
| 6,931,545 B1 | 8/2005 | Ta et al. | |
| 6,941,312 B1 | 9/2005 | Hoffman et al. | |
| 6,944,168 B2 | 9/2005 | Paatela et al. | |
| 6,971,017 B2 | 11/2005 | Stringer et al. | |
| 6,978,223 B2 | 12/2005 | Milliken | |
| 6,981,054 B1 | 12/2005 | Krishna | |
| 7,016,910 B2 | 3/2006 | Egilsson et al. | |
| 7,016,914 B2 | 3/2006 | Nayak | |
| 7,024,408 B2 | 4/2006 | Dehlinger et al. | |
| 7,028,250 B2 | 4/2006 | Ukrainczyk et al. | |
| 7,051,037 B1 | 5/2006 | Thomas et al. | |
| 7,054,854 B1 | 5/2006 | Hattori et al. | |
| 7,055,039 B2 | 5/2006 | Chavanne et al. | |
| 7,082,427 B1 | 7/2006 | Seibel et al. | |
| 7,089,188 B2 | 8/2006 | Logan et al. | |
| 7,092,956 B2 | 8/2006 | Ruediger | |
| 7,093,023 B2 | 8/2006 | Lockwood et al. | |
| 7,096,179 B2 | 8/2006 | Zhu et al. | |
| 7,106,905 B2 | 9/2006 | Simske | |
| 7,113,954 B2 | 9/2006 | Vogel | |
| 7,117,437 B2 | 10/2006 | Chen et al. | |
| 7,120,079 B2 | 10/2006 | McCollum et al. | |
| 7,120,699 B2 | 10/2006 | Stork et al. | |
| 7,124,140 B2 | 10/2006 | Barton | |
| 7,130,913 B2 | 10/2006 | Fallon | |
| 7,139,743 B2 | 11/2006 | Indeck et al. | |
| 7,161,506 B2 | 1/2007 | Fallon | |
| 7,167,980 B2 | 1/2007 | Chiu | |
| 7,181,437 B2 | 2/2007 | Indeck et al. | |
| 7,181,608 B2 | 2/2007 | Fallon et al. | |
| 7,222,114 B1 | 5/2007 | Chan et al. | |
| 7,321,937 B2 | 1/2008 | Fallon | |
| 7,353,267 B1 | 4/2008 | Cunningham et al. | |
| 7,362,859 B1 | 4/2008 | Robertson et al. | |
| 7,378,992 B2 | 5/2008 | Fallon | |
| 7,386,046 B2 | 6/2008 | Fallon et al. | |
| 7,411,957 B2 | 8/2008 | Stacy et al. | |
| 7,417,568 B2 | 8/2008 | Fallon et al. | |
| 7,444,515 B2 | 10/2008 | Dharmapurikar et al. | |
| 7,552,107 B2 | 6/2009 | Indeck et al. | |
| 7,558,925 B2 | 7/2009 | Bouchard et al. | |
| 7,570,760 B1 | 8/2009 | Olson et al. | |
| 7,587,614 B1 * | 9/2009 | Langhammer | 713/189 |
| 7,620,821 B1 | 11/2009 | Grohoski et al. | |
| 7,623,660 B1 | 11/2009 | Cory | |
| 7,636,703 B2 | 12/2009 | Taylor | |
| 7,660,793 B2 | 2/2010 | Indeck et al. | |
| 7,680,790 B2 | 3/2010 | Indeck et al. | |
| 7,702,629 B2 | 4/2010 | Cytron et al. | |
| 7,714,747 B2 | 5/2010 | Fallon | |
| 7,885,405 B1 | 2/2011 | Bong | |
| 8,095,508 B2 | 1/2012 | Chamberlain et al. | |
| 8,131,697 B2 | 3/2012 | Indeck et al. | |
| 8,155,308 B1 | 4/2012 | Poo et al. | |
| 8,156,101 B2 | 4/2012 | Indeck et al. | |
| 8,374,986 B2 | 2/2013 | Indeck et al. | |
| 8,879,727 B2 | 11/2014 | Taylor et al. | |
| 8,983,063 B1 | 3/2015 | Taylor et al. | |
| 9,020,928 B2 | 4/2015 | Indeck et al. | |
| 9,047,243 B2 | 6/2015 | Taylor et al. | |
| 9,176,775 B2 | 11/2015 | Chamberlain et al. | |
| 2001/0007127 A1 | 7/2001 | Staring | |
| 2001/0033656 A1 | 10/2001 | Gligor et al. | |
| 2001/0052038 A1 | 12/2001 | Fallon et al. | |
| 2001/0056547 A1 | 12/2001 | Dixon | |
| 2002/0006196 A1 | 1/2002 | Shimoyama et al. | |
| 2002/0016773 A1 | 2/2002 | Ohkuma et al. | |
| 2002/0021802 A1 | 2/2002 | Muratani et al. | |
| 2002/0041685 A1 | 4/2002 | McLoone et al. | |
| 2002/0080871 A1 | 6/2002 | Fallon et al. | |
| 2002/0103663 A1 | 8/2002 | Bankier et al. | |
| 2002/0105911 A1 | 8/2002 | Pruthi et al. | |
| 2002/0106078 A1 | 8/2002 | Qi et al. | |
| 2002/0112167 A1 | 8/2002 | Boneh et al. | |
| 2002/0116508 A1 | 8/2002 | Khan et al. | |
| 2002/0129140 A1 | 9/2002 | Peled et al. | |
| 2002/0150248 A1 | 10/2002 | Kovacevic | |
| 2002/0162025 A1 | 10/2002 | Sutton et al. | |
| 2002/0166063 A1 | 11/2002 | Lachman et al. | |
| 2002/0169873 A1 | 11/2002 | Zodnik | |
| 2002/0181709 A1 | 12/2002 | Sorimachi et al. | |
| 2002/0191784 A1 | 12/2002 | Yup et al. | |
| 2002/0191790 A1 | 12/2002 | Anand et al. | |
| 2002/0191791 A1 * | 12/2002 | Anand | H04L 9/0643 380/255 |
| 2003/0009693 A1 | 1/2003 | Brock et al. | |
| 2003/0014521 A1 | 1/2003 | Elson et al. | |
| 2003/0014662 A1 | 1/2003 | Gupta et al. | |
| 2003/0018630 A1 | 1/2003 | Indeck et al. | |
| 2003/0023876 A1 | 1/2003 | Bardsley et al. | |

(56) References Cited

U.S. PATENT DOCUMENTS

| | | |
|---|---|---|
| 2003/0035547 A1 | 2/2003 | Newton |
| 2003/0039355 A1 | 2/2003 | McCanny et al. |
| 2003/0043805 A1 | 3/2003 | Graham et al. |
| 2003/0048903 A1 | 3/2003 | Ito et al. |
| 2003/0051043 A1 | 3/2003 | Wyschogrod et al. |
| 2003/0059054 A1 | 3/2003 | Hu et al. |
| 2003/0065943 A1 | 4/2003 | Geis et al. |
| 2003/0068036 A1 | 4/2003 | Macchetti et al. |
| 2003/0074582 A1 | 4/2003 | Patel et al. |
| 2003/0090397 A1 | 5/2003 | Rasmussen |
| 2003/0099352 A1 | 5/2003 | Lu et al. |
| 2003/0105721 A1 | 6/2003 | Ginter et al. |
| 2003/0108195 A1 | 6/2003 | Okada et al. |
| 2003/0110229 A1 | 6/2003 | Kulig et al. |
| 2003/0115485 A1 | 6/2003 | Milliken |
| 2003/0128841 A1 | 7/2003 | Ouyang |
| 2003/0149869 A1 | 8/2003 | Gleichauf |
| 2003/0163715 A1 | 8/2003 | Wong |
| 2003/0169877 A1 | 9/2003 | Liu et al. |
| 2003/0177253 A1 | 9/2003 | Schuehler et al. |
| 2003/0184593 A1 | 10/2003 | Dunlop |
| 2003/0187662 A1 | 10/2003 | Wilson |
| 2003/0191876 A1 | 10/2003 | Fallon |
| 2003/0198345 A1 | 10/2003 | Van Buer |
| 2003/0206627 A1* | 11/2003 | Penugonda et al. ............ 380/2 |
| 2003/0221013 A1 | 11/2003 | Lockwood et al. |
| 2004/0015502 A1 | 1/2004 | Alexander et al. |
| 2004/0028047 A1 | 2/2004 | Hou et al. |
| 2004/0049596 A1 | 3/2004 | Schuehler et al. |
| 2004/0064737 A1 | 4/2004 | Milliken et al. |
| 2004/0117645 A1 | 6/2004 | Okuda et al. |
| 2004/0146164 A1 | 7/2004 | Jonas et al. |
| 2004/0165721 A1 | 8/2004 | Sano et al. |
| 2004/0196905 A1 | 10/2004 | Yamane et al. |
| 2004/0205149 A1 | 10/2004 | Dillon et al. |
| 2004/0208072 A1* | 10/2004 | Henry ............ G06F 9/30003 365/203 |
| 2004/0208318 A1 | 10/2004 | Henry et al. |
| 2004/0218762 A1 | 11/2004 | Le Saint et al. |
| 2004/0228479 A1 | 11/2004 | Crispin et al. |
| 2004/0255130 A1 | 12/2004 | Henry et al. |
| 2005/0005145 A1 | 1/2005 | Teixeira |
| 2005/0086520 A1 | 4/2005 | Dharmapurikar et al. |
| 2005/0094805 A1 | 5/2005 | Kitani et al. |
| 2005/0135607 A1 | 6/2005 | Lee et al. |
| 2005/0135608 A1 | 6/2005 | Zheng |
| 2005/0175175 A1 | 8/2005 | Leech |
| 2005/0190923 A1* | 9/2005 | Noh et al. ............ 380/278 |
| 2005/0195832 A1 | 9/2005 | Dharmapurikar et al. |
| 2005/0207571 A1 | 9/2005 | Ahn et al. |
| 2005/0229254 A1 | 10/2005 | Singh et al. |
| 2005/0265556 A1 | 12/2005 | Odate et al. |
| 2006/0002549 A1* | 1/2006 | Avasarala et al. ............ 380/44 |
| 2006/0053295 A1 | 3/2006 | Madhusudan et al. |
| 2006/0059213 A1 | 3/2006 | Evoy |
| 2006/0072746 A1 | 4/2006 | Tadepalli |
| 2006/0101005 A1 | 5/2006 | Yang et al. |
| 2006/0129745 A1 | 6/2006 | Thiel et al. |
| 2006/0147040 A1 | 7/2006 | Lee et al. |
| 2006/0269148 A1 | 11/2006 | Farber et al. |
| 2006/0294059 A1 | 12/2006 | Chamberlain et al. |
| 2007/0061594 A1 | 3/2007 | Ginter et al. |
| 2007/0067108 A1 | 3/2007 | Buhler et al. |
| 2007/0067481 A1 | 3/2007 | Sharma et al. |
| 2007/0074047 A1 | 3/2007 | Metzger et al. |
| 2007/0078837 A1 | 4/2007 | Indeck et al. |
| 2007/0094199 A1 | 4/2007 | Deshpande et al. |
| 2007/0098153 A1 | 5/2007 | Nishikawa |
| 2007/0098155 A1 | 5/2007 | Nagasawa et al. |
| 2007/0118500 A1 | 5/2007 | Indeck et al. |
| 2007/0130140 A1 | 6/2007 | Cytron et al. |
| 2007/0140478 A1* | 6/2007 | Komano et al. ............ 380/28 |
| 2007/0174841 A1 | 7/2007 | Chamberlain et al. |
| 2007/0183594 A1 | 8/2007 | Russell |
| 2007/0237327 A1 | 10/2007 | Taylor et al. |
| 2007/0260602 A1 | 11/2007 | Taylor |
| 2007/0277036 A1 | 11/2007 | Chamberlain et al. |
| 2007/0286415 A1 | 12/2007 | Bertoni et al. |
| 2007/0297608 A1 | 12/2007 | Jonas et al. |
| 2008/0019524 A1* | 1/2008 | Kim ............ H04L 9/0631 380/259 |
| 2008/0065905 A1* | 3/2008 | Salessi ............ 713/193 |
| 2008/0086274 A1 | 4/2008 | Chamberlain et al. |
| 2008/0109413 A1 | 5/2008 | Indeck et al. |
| 2008/0114724 A1 | 5/2008 | Indeck et al. |
| 2008/0114725 A1 | 5/2008 | Indeck et al. |
| 2008/0114760 A1 | 5/2008 | Indeck et al. |
| 2008/0126320 A1 | 5/2008 | Indeck et al. |
| 2008/0130872 A1 | 6/2008 | Bolotov et al. |
| 2008/0133453 A1 | 6/2008 | Indeck et al. |
| 2008/0133519 A1 | 6/2008 | Indeck et al. |
| 2008/0189251 A1 | 8/2008 | Branscome et al. |
| 2008/0219448 A1* | 9/2008 | Almeida ............ H04L 9/065 380/277 |
| 2008/0243675 A1 | 10/2008 | Parsons et al. |
| 2008/0260158 A1 | 10/2008 | Chin et al. |
| 2008/0294913 A1 | 11/2008 | Nakagoe et al. |
| 2009/0060197 A1 | 3/2009 | Taylor et al. |
| 2010/0094858 A1 | 4/2010 | Indeck et al. |
| 2010/0198850 A1 | 8/2010 | Cytron et al. |
| 2011/0125960 A1 | 5/2011 | Casselman |
| 2011/0199243 A1 | 8/2011 | Fallon et al. |
| 2011/0252008 A1 | 10/2011 | Chamberlain et al. |
| 2012/0109849 A1 | 5/2012 | Chamberlain et al. |
| 2012/0110316 A1 | 5/2012 | Chamberlain et al. |
| 2013/0007000 A1 | 1/2013 | Indeck et al. |
| 2013/0151458 A1 | 6/2013 | Indeck et al. |
| 2015/0052148 A1 | 2/2015 | Indeck et al. |
| 2015/0055776 A1 | 2/2015 | Taylor et al. |

FOREIGN PATENT DOCUMENTS

| | | |
|---|---|---|
| EP | 0887723 | 12/1998 |
| EP | 0911738 A | 4/1999 |
| JP | 2000286715 A | 10/2000 |
| JP | 2001268071 A | 9/2001 |
| JP | 2001285283 A | 10/2001 |
| JP | 2001518724 | 10/2001 |
| JP | 2001357048 A | 12/2001 |
| JP | 2002101089 A | 4/2002 |
| JP | 2002108910 A | 4/2002 |
| JP | 2003122442 A | 4/2003 |
| JP | 2005242997 A | 9/2005 |
| WO | 9409443 A1 | 4/1994 |
| WO | 9905814 | 2/1999 |
| WO | 9955052 | 10/1999 |
| WO | 0041136 A1 | 7/2000 |
| WO | 0122425 A | 3/2001 |
| WO | 0161913 | 8/2001 |
| WO | 01/74071 A1 | 10/2001 |
| WO | 0180558 | 10/2001 |
| WO | 02061525 | 8/2002 |
| WO | 03100650 | 4/2003 |
| WO | 03036845 | 5/2003 |
| WO | 2004017604 | 2/2004 |
| WO | 2004042560 A | 5/2004 |
| WO | 2004042561 A | 5/2004 |
| WO | 2004042562 | 5/2004 |
| WO | 2004042574 A | 5/2004 |
| WO | 2005017708 A | 2/2005 |
| WO | 2005026925 | 3/2005 |
| WO | 2005048134 A | 5/2005 |
| WO | 2006023948 | 3/2006 |
| WO | 2007087507 | 8/2007 |
| WO | 2009029842 | 3/2009 |

OTHER PUBLICATIONS

Ramakrishna et al., "Efficient Hardware Hashing Functions for High Performance Computers", IEEE Transactions on Computers, Dec. 1997, vol. 46, No. 12.

Ranganathan et al., "High-Speed VLSI Designs for Lempe-Ziv Based Data Compression", IEEE Transactions on Circuits and Sys-

(56) References Cited

OTHER PUBLICATIONS tems—II: Analog and Digital Signal Processing, Feb. 1993, pp. 96-106, vol. 40, No. 2, Institute of Electrical and Electronics Engineers, Washington, DC, USA.
Ratha et al., "Convolution on Splash 2", Proceedings of IEEE Symposium on FPGAS for Custom Computing Machines, Apr. 19, 1995, pp. 204-213, Los Alamitos, California.
Ratha et al., "FPGA-based coprocessor for text string extraction", IEEE, Sep. 11-13, 2000, pp. 217-221.
Roesch, "Snort—Lightweight Intrusion Detection for Networks", Proceedings of LISA '99: 13th Systems Administration Conference; Nov. 7-12, 1999; pp. 229-238; USENIX Association, Seattle, WA USA.
Roy, "A bounded search algorithm for segmented channel routing for FPGA's and associated channel architecture issues", IEEE, Nov. 11, 1993, pp. 1695-1705, vol. 12.
Sachin Tandon, "A Programmable Architecture for Real-Time Derivative Trading", Master's Thesis, University of Edinburgh, 2003.
Schmit, "Incremental Reconfiguration for Pipelined Applications", FPGAs for Custom Computing Machines, Proceedings, The 5th Annual IEEE Symposium, Dept. of ECE, Carnegie Mellon University, Apr. 16-18, 1997, pp. 47-55, Pittsburgh, PA.
Schuehler et al., "Architecture for a Hardware Based, TCP/IP Content Scanning System", IEEE Micro, 24(1):62-69, Jan.-Feb. 2004, USA.
Schuehler et al., "TCP-Splitter: A TCP/IP Flow Monitor in Reconfigurable Hardware", Hot Interconnects 10 (Hotl-10), Stanford, CA, Aug. 21-23, 2002, pp. 127-131.
Seki et al., "High Speed Computation of Shogi With FPGA", Proceedings of 58th Convention Architecture, Software Science, Engineering, Mar. 9, 1999, pp. 1-133-1-134.
Shah, "Understanding Network Processors", Version 1.0, University of California-Berkeley, Sep. 4, 2001.
Shalunov et al., "Bulk TCP Use and Performance on Internet 2", ACM SIGCOMM Internet Measurement Workshop, 2001.
Shasha et al., "Database Tuning", 2003, pp. 280-284, Morgan Kaufmann Publishers.
Shirazi et al., "Quantitative Analysis of FPGA-based Database Searching", Journal of VLSI Signal Processing Systems for Signal, Image, and Video Technology, May 2001, pp. 85-96, vol. 28, No. 1/2, Kluwer Academic Publishers, Dordrecht, NL.
Sidhu et al., "Fast Regular Expression Matching Using FPGAs", IEEE Symposium on Field Programmable Custom Computing Machines (FCCM 2001), Apr. 2001.
Sidhu et al., "String Matching on Multicontext FPGAs Using Self-Reconfiguration", FPGA '99: Proceedings of the 1999 ACM/SIGDA 7th International Symposium on Field Programmable Gate Arrays, Feb. 1999, pp. 217-226.
Singh et al., "The EarlyBird System for Real-Time Detection on Unknown Worms", Technical report CS2003-0761, Aug. 2003.
Skiena et al., "Programming Challenges: The Programming Contest Training Manual", 2003, pp. 30-31, Springer.
Sourdis and Pnevmatikatos, "Fast, Large-Scale String Match for a 10Gbps FPGA-based Network Intrusion Detection System", 13th International Conference on Field Programmable Logic and Applications, 2003.
Tan et al., "A High Throughput String Matching Architecture for Intrusion Detection and Prevention", ISCA 2005: 32nd Annual International Symposium on Computer Architecture, pp. 112-122, 2005.
Tau et al., "Transit Note #114: A First Generation DPGA Implementation", Jan. 1995, 9 pages.
Taylor et al., "Dynamic Hardware Plugins (DHP): Exploiting Reconfigurable Hardware for High-Performance Programmable Routers", Computer Networks, 38(3): 295-310 (16), Feb. 21, 2002, and online at http://www.cc.gatech.edu/classes/AY2007/cs8803hpc_fall/papers/phplugins.pdf.
Taylor et al., "Generalized RAD Module Interface Specification of the Field Programmable Port Extender (FPX) Version 2", Washington University, Department of Computer Science, Technical Report, Jul. 5, 2001, pp. 1-10.
Taylor et al., "Modular Design Techniques for the FPX", Field Programmable Port Extender: Jan. 2002 Gigabit Workshop Tutorial, Washington University, St. Louis, MO, Jan. 3-4, 2002.
Uluski et al., "Characterizing Antivirus Workload Execution", SIGARCH Comput. Archit. News, vol. 33, No. 1, pp. 90-98, Mar. 2005.
Villasenor et al., "Configurable Computing Solutions for Automatic Target Recognition", FPGAS for Custom Computing Machines, 1996, Proceedings, IEEE Symposium on Napa Valley, CA, Apr. 17-19, 1996, pp. 70-79, 1996 IEEE, Napa Valley, CA, Los Alamitos, CA, USA.
Waldvogel et al., "Scalable High-Speed Prefix Matching", ACM Transactions on Computer Systems, Nov. 2001, pp. 440-482, vol. 19, No. 4.
Ward et al., "Dynamically Reconfigurable Computing: A Novel Computation Technology with Potential to Improve National Security Capabilities", May 15, 2003, A White Paper Prepared by Star Bridge Systems, Inc. [retrieved Dec. 12, 2006]. Retrieved from the Internet: <URL: http://www.starbridgesystems.com/resources/whitepapers/Dynamically%20Reconfigurable%20Computing.pdf.
Weaver et al., "Very Fast Containment of Scanning Worms", Proc. USENIX Security Symposium 2004, San Diego, CA, Aug. 2004, located at http://www.icsi.berkely.edu/~nweaver/containment/containment.pdf.
West et al., "An FPGA-Based Search Engine for Unstructured Database", Proc. of 2nd Workshop on Application Specific Processors, Dec. 2003, San Diego, CA.
Wooster et al., "HTTPDUMP Network HTTP Packet Snooper", Apr. 25, 1996.
Yamaguchi et al., "High Speed Homology Search with FPGAs", Proceedings Pacific Symposium on Biocomputing, Jan. 3-7, 2002, pp. 271-282, vol. 7, Online, Lihue, Hawaii, USA.
Yan et al., "Enhancing Collaborative Spam Detection with Bloom Filters", 2006, IEEE, pp. 414-425.
Yoshitani et al., "Performance Evaluation of Parallel Volume Rendering Machine Re Volver/C40", Study Report of Information Processing Society, Mar. 5, 1999, pp. 79-84, vol. 99, No. 21.
Ziv et al., "A Universal Algorithm for Sequential Data Compression", IEEE Trans. Inform. Theory, IT-23(3): 337-343 (1997).
Ziv et al., "Compression of Individual Sequence via Variable-Rate Coding", IEEE Transactions on Information Theory, Sep. 1978, pp. 530-536, vol. IT-24, No. 5, Institute of Electrical and Electronics Engineers, Washington, DC, USA.
Gupta et al., "High-Speed Implementations of Rule-Based Systems," ACM Transactions on Computer Systems, May 1989, pp. 119-146, vol. 7, Issue 2.
Gupta et al., "PMM: A Parallel Architecture for Production Systems," Proceedings of the IEEE, Apr. 1992, pp. 693-696, vol. 2.
Hauck et al., "Software Technologies for Reconfigurable Systems", Northwestern University, Dept. of ECE, Technical Report, 1996.
Herbordt et al., "Single Pass, BLAST-Like, Approximate String Matching on FPGAs", 14th Annual IEEE Symposium on Field Programmable Custom Computing Machines (FCCM'06), Apr. 2006, pp. 1-10, IEEE.
Hollaar, "Hardware Systems for Text Information Retrieval", Proceedings of the Sixth Annual International ACM Sigir Conference on Research and Development in Information Retrieval, Jun. 6-8, 1983, pp. 3-9, Baltimore, Maryland, USA.
Hutchings et al., "Assisting Network Intrusion Detection with Reconfigurable Hardware", FCCM 2002: 10th Annual IEEE Symposium on Field-Programmable Custom Computing Machines, 2002.
International Preliminary Report on Patentability (Chapter I) for PCT/US2008/074862 issued Mar. 11, 2010.
International Search Report for PCT/US2002/033286 dated Jan. 22, 2003.
International Search Report for PCT/US2005/030046; Sep. 25, 2006.
International Search Report for PCT/US2008/074862 dated Nov. 12, 2008.

(56) References Cited

OTHER PUBLICATIONS

Jacobson et al., "RFC 1072: TCP Extensions for Long-Delay Paths", Oct. 1988.
Jacobson et al., "tcpdump—dump traffic on a network", Jun. 30, 1997, online at www.cse.cuhk.edu.hk/~cslui/CEG4430/tcpdump.ps.gz.
Jung et al., "Efficient VLSI for Lempel-Ziv Compression in Wireless Data Communication Networks", IEEE Transactions on VLSI Systems, Sep. 1998, pp. 475-483, vol. 6, No. 3, Institute of Electrical and Electronics Engineers, Washington, DC, USA.
Lockwood et al., "Field Programmable Port Extender (FPX) for Distributed Routing and Queuing", ACM International Symposium on Field Programmable Gate Arrays (FPGA 2000), Monterey, CA, Feb. 2000, pp. 137-144.
Lockwood et al., "Hello, World: A Simple Application for the Field Programmable Port Extender (FPX)", Washington University, Department of Computer Science, Technical Report WUCS-00-12, Jul. 11, 2000.
Lockwood et al., "Parallel FPGA Programming over Backplane Chassis", Washington University, Department of Computer Science, Technical Report WUCS-00-11, Jun. 12, 2000.
Lockwood et al., "Reprogrammable Network Packet Processing on the Field Programmable Port Extender (FPX)", ACM International Symposium on Field Programmable Gate Arrays (FPGA 2001), Monterey, CA, Feb. 2001, pp. 87-93.
Lockwood, "An Open Platform for Development of Network Processing Modules in Reprogrammable Hardware", IEC DesignCon 2001, Santa Clara, CA, Jan. 2001, Paper WB-19.
Lockwood, "Building Networks with Reprogrammable Hardware", Field Programmable Port Extender: Jan. 2002 Gigabit Workshop Tutorial, Washington University, St. Louis, MO, Jan. 3-4, 2002.
Lockwood, "Evolvable Internet Hardware Platforms", NASA/DoD Workshop on Evolvable Hardware (EHW'01), Long Beach, CA, Jul. 12-14, 2001, pp. 271-279.
Lockwood, "Hardware Laboratory Configuration", Field Programmable Port Extender: Jan. 2002 Gigabit Workshop Tutorial, Washington University, St. Louis, MO, Jan. 3-4, 2002.
Lockwood, "Introduction", Field Programmable Port Extender: Jan. 2002 Gigabit Workshop Tutorial, Washington University, St. Louis, MO, Jan. 3-4, 2002.
Lockwood, "Platform and Methodology for Teaching Design of Hardware Modules in Internet Routers and Firewalls", IEEE Computer Society International Conference on Microelectronic Systems Education (MSE'2001), Las Vegas, NV, Jun. 17-18, 2001, pp. 56-57.
Lockwood, "Protocol Processing on the FPX", Field Programmable Port Extender: Jan. 2002 Gigabit Workshop Tutorial, Washington University, St. Louis, MO, Jan. 3-4, 2002.
Lockwood, "Simulation and Synthesis", Field Programmable Port Extender: Jan. 2002 Gigabit Workshop Tutorial, Washington University, St. Louis, MO, Jan. 3-4, 2002.
Lockwood, "Simulation of the Hello World Application for the Field-Programmable Port Extender (FPX)", Washington University, Applied Research Lab, Spring 2001 Gigabits Kits Workshop.
Madhusudan, "Design of a System for Real-Time Worm Detection", Hot Interconnects, pp. 77-83, Stanford, CA, Aug. 2004, found at http://www.hoti.org/hoti12/program/papers/2004/paper4.2.pdf.
Madhusudan, "Design of a System for Real-Time Worm Detection", Power Point Presentation in Support of Master's Thesis, Washington Univ., Dept. of Computer Science and Engineering, St. Louis, MO, Aug. 2004.
Mosanya et al., "A FPGA-Based Hardware Implementation of Generalized Profile Search Using Online Arithmetic", ACM/Sigda International Symposium on Field Programmable Gate Arrays (FPGA '99), Feb. 21-23, 1999, pp. 101-111, Monterey, CA, USA.
Moscola et al., "FPGrep and FPSed: Regular Expression Search and Substitution for Packet Streaming in Field Programmable Hardware", Dept. of Computer Science, Applied Research Lab, Washington University, Jan. 8, 2002, unpublished, pp. 1-19, St. Louis, MO.
Moscola et al., "FPSed: A Streaming Content Search-and-Replace Module for an Internet Firewall", Proc. of Hot Interconnects, 11th Symposium on High Performance Interconnects, pp. 122-129, Aug. 20, 2003.
Moscola, "FPGrep and FPSed: Packet Payload Processors for Managing the Flow of Digital Content on Local Area Networks and the Internet", Master's Thesis, Sever Institute of Technology, Washington University, St. Louis, MO, Aug. 2003.
Motwani et al., "Randomized Algorithms", 1995, pp. 215-216, Cambridge University Press.
Navarro, "A Guided Tour to Approximate String Matching", ACM Computing Surveys, vol. 33, No. 1, Mar. 2001, pp. 31-88.
Necker et al., "TCP-Stream Reassembly and State Tracking in Hardware", School of Electrical and Computer Engineering, Georgia Institute of Technology, Atlanta, GA.
Nunez et al., "The X-MatchLITE FPGA-Based Data Compressor", Euromicro Conference 1999, Proceedings, Italy, Sep. 8-10, 1999, pp. 126-132, Los Alamitos, CA.
Nwodoh et al., "A Processing System for Real-Time Holographic Video Computation", Reconfigurable Technology: FPGAs for Computing and Application, Proceedings for the SPIE, Sep. 1999, Boston, pp. 129-140, vol. 3844.
Office Action for U.S. Appl. No. 10/550,323 dated Jan. 3, 2011.
Office Action for U.S. Appl. No. 10/550,326 dated Dec. 23, 2010.
Office Action for U.S. Appl. No. 11/690,034 dated Dec. 14, 2010.
Office Action for U.S. Appl. No. 11/690,034 issued Aug. 3, 2011.
Patterson, "High Performance DES Encryption in Virtex™ FPGAs using JBits™", IEEE Symposium on Field-Programmable Custom Computing Machines, 2000, pp. 113-121.
Pirsch et al., "VLSI Architectures for Video Compression—A Survey", Proceedings of the IEEE, Feb. 1995, pp. 220-243, vol. 83, No. 2, Institute of Electrical and Electronics Engineers, Washington, DC, USA.
Pramanik et al., "A Hardware Pattern Matching Algorithm on a Dataflow"; Computer Journal; Jul. 1, 1985; pp. 264-269; vol. 28, No. 3; Oxford University Press, Surrey, Great Britain.
Prosecution History for U.S. Appl. No. 12/201,259, now U.S. Pat. No. 8,879,727, filed Aug. 29, 2008 (Taylor et al.).
"Lucent Technologies Delivers "PayloadPlus" Network Processors for Programmable, MultiProtocol, OC-48c Processing", Lucent Technologies Press Release, downloaded from http://www.lucent.com/press/1000/0010320.meb.html on Mar. 21, 2002.
"Overview, Field Programmable Port Extender", Jan. 2002 Gigabit Workshop Tutorial, Washington University, St. Louis, MO, Jan. 3-4, 2002, pp. 1-4.
"Payload Plus™ Agere System Interface", Agere Systems Product Brief, Jun. 2001, downloaded from Internet, Jan. 2002, pp. 1-6.
"RFC793: Transmission Control Protocol, Darpa Internet Program, Protocol Specification", Sep. 1981.
"Technology Overview", Data Search Systems Incorporated, downloaded from the http://www.datasearchsystems.com/tech.htm on Apr. 19, 2004.
"The Field-Programmable Port Extender (FPX)", downloaded from http://www.arl.wustl.edu/arl/ in Mar. 2002.
Aldwairi et al., "Configurable String Matching Hardware for Speeding up Intrusion Detection", SIRARCH Comput. Archit. News, vol. 33, No. 1, pp. 99-107, Mar. 2005.
Amanuma et al., "A FPGA Architecture for High Speed Computation", Proceedings of 60th Convention Architecture, Software Science, Engineering, Mar. 14, 2000, pp. 1-163-1-164, Information Processing Society, Japan.
Amer-Yahia et al., "XQuery 1.0 and XPath 2.0 Full-Text 1.0", W3C Working Draft, http://www.w3.org/TR/query-full-text/, May 18, 2007—parts 1-4.
Anerousis et al., "Using the AT&T Labs PacketScope for Internet Measurement, Design, and Performance Analysis", Network and Distributed Systems Research Laboratory, AT&T Labs-Research, Florham, Park, NJ, Oct. 1997.
ANSI X9.52/1998, "Triple Data Encryption Algorithm Modes of Operation", American National Standards Institute, Approved: Jul. 29, 1998.
Arnold et al., "The Splash 2 Processor and Applications", Proceedings 1993 IEEE International Conference on Computer Design:

(56) References Cited

OTHER PUBLICATIONS

VLSI in Computers and Processors (ICCD '93), Oct. 3, 1993, pp. 482-485, IEEE Computer Society, Cambridge, MA USA.
Artan et al., "Multi-packet Signature Detection using Prefix Bloom Filters", 2005, IEEE, pp. 1811-1816.
Asami et al., "Improvement of DES Key Search on FPGA-Based Parallel Machine "RASH"", Proceedings of Information Processing Society, Aug. 15, 2000, pp. 50-57, vol. 41, No. SIG5 (HPS1), Japan.
Baboescu et al., "Scalable Packet Classification," SIGCOMM'01, Aug. 27-31, 2001, pp. 199-210, San Diego, California, USA; http://www.ecse.rpi.edu/homepages/shivkuma/teaching/sp2001/readings/baboescu-pkt-classification.pdf.
Baeza-Yates et al., "New and Faster Filters for Multiple Approximate String Matching", Random Structures and Algorithms (RSA), Jan. 2002, pp. 23-49, vol. 20, No. 1.
Baker et al., "High-throughput Linked-Pattern Matching for Intrusion Detection Systems", ANCS 2005: Proceedings of the 2005 Symposium on Architecture for Networking and Communications Systems, pp. 193-202, ACM Press, 2005.
Bloom, "Space/Time Trade-offs in Hash Coding With Allowable Errors", Communications of the ACM, Jul. 1970, pp. 422-426, vol. 13, No. 7, Computer Usage Company, Newton Upper Falls, Massachusetts, USA.
Braun et al., "Layered Protocol Wrappers for Internet Packet Processing in Reconfigurable Hardware", Proceedings of Hot Interconnects 9 (HotI-9) Stanford, CA, Aug. 22-24, 2001, pp. 93-98.
Braun et al., "Protocol Wrappers for Layered Network Packet Processing in Reconfigurable Hardware", IEEE Micro, Jan.-Feb. 2002, pp. 66-74.
Brodie et al., "Dynamic Reconfigurable Computing", in Proc. of 9th Military and Aerospace Programmable Logic Devices International Conference, Sep. 2006.
Celko, "Joe Celko's Data & Databases: Concepts in Practice", 1999, pp. 72-74, Morgan Kaufmann Publishers.
Chamberlain et al., "Achieving Real Data Throughput for an FPGA Co-Processor on Commodity Server Platforms", Proc. of 1st Workshop on Building Block Engine Architectures for Computers and Networks, Oct. 2004, Boston, MA.
Chamberlain et al., "The Mercury System: Embedding Computation Into Disk Drives", 7th High Performance Embedded Computing Workshop, Sep. 2003, Boston, MA.
Chamberlain et al., "The Mercury System: Exploiting Truly Fast Hardware for Data Search", Proc. of Workshop on Storage Network Architecture and Parallel I/Os, Sep. 2003, New Orleans, LA.
Cho et al., "Deep Packet Filter with Dedicated Logic and Read Only Memories", 12th Annual IEEE Symposium on Field-Programmable Custom Computing Machines, Apr. 2004.
Chodowiec et al., "Fast Implementations of Secret-Key Block Ciphers Using Mixed Inter- and Outer-Round Pipelining", Proceedings of International Symposium on FPGAs, pp. 94-102 (Feb. 2001).
Choi et al., "Design of a Flexible Open Platform for High Performance Active Networks", Allerton Conference, 1999, Champaign, IL.
Clark et al., "Scalable Pattern Matching for High Speed Networks", Proceedings of the 12th Annual IEEE Symposium on Field-Programmable Custom Computing Machines, 2004; FCCM 2004, Apr. 20-23, 2004; pp. 249-257; IEEE Computer Society; Cambridge, MA USA.
Cloutier et al., "VIP: An FPGA-Based Processor for Image Processing and Neural Networks", Proceedings of Fifth International Conference on Microelectronics for Neural Networks, Feb. 12, 1996, pp. 330-336, Los Alamitos, California.
Compton et al., "Configurable Computing: A Survey of Systems and Software", Technical Report, Northwestern University, Dept. of ECE, 1999.
Compton et al., "Reconfigurable Computing: A Survey of Systems and Software", Technical Report, Northwestern University, Dept. of ECE, 1999, presented by Yi-Gang Tai.
Cuppu and Jacob, "Organizational Design Trade-Offs at the DRAM, Memory Bus and Memory Controller Level: Initial Results," Technical Report UMB-SCA-1999-2, Univ. of Maryland Systems & Computer Architecture Group, Nov. 1999, pp. 1-10.
Department of Computer Science & Engineering; "Technical Reports"; Publication (http://cse.seas.wustl.edu/Research/Publications.asp); Dec. 17, 2007; pp. 1-26; Washington University in St. Louis.
Dharmapurikar et al., "Deep Packet Inspection Using Parallel Bloom Filters," IEEE Micro, Jan.-Feb. 2004, Volume: 24, Issue: 1, pp. 52-61.
Dharmapurikar et al., "Deep Packet Inspection Using Parallel Bloom Filters," Symposium on High Performance Interconnects (HotI), Stanford, California, 2003, pp. 44-51.
Dharmapurikar et al., "Design and Implementation of a String Matching System for Network Intrusion Detection using FPGA-based Bloom Filters", Proc. of 12th Annual IEEE Symposium on Field Programmable Custom Computing Machines, 2004, pp. 1-10.
Dharmapurikar et al., "Longest Prefix Matching Using Bloom Filters," SIGCOMM, 2003, pp. 201-212.
Dharmapurikar et al., "Robust TCP Stream Reassembly in the Presence of Adversaries", Proc. of the 14th Conference on USENIX Security Symposium—vol. 14, 16 pages, Baltimore, MD, 2005; http://www.icir.org/vern/papers/TcpReassembly/TCPReassembly.pdf.
Dharmapurikar, "Fast and Scalable Pattern Matching for Content Filtering", ACM, ANCS 05, 2005, pp. 183-192.
Ebeling et al., "RaPiD—Reconfigurable Pipelined Datapath", University of Washington, Dept. of Computer Science and Engineering, Sep. 23, 1996, Seattle, WA.
FIPS 197, "Advanced Encryption Standard", National Institute of Standards and Technology (2001).
FIPS 46-2, "Data Encryption Standard", revised version issued as FIPS 46-3, National Institute of Standards Technology, Dec. 30, 1993.
FIPS Pub. 46-3. Data Encryption Standard (DES). Revised version of 46-2. Reaffirmed Oct. 25, 1999.
Franklin et al., "An Architecture for Fast Processing of Large Unstructured Data Sets." Proc. of 22nd Int'l Conf. on Computer Design, Oct. 2004, pp. 280-287.
Franklin et al., "Assisting Network Intrusion Detection with Reconfigurable Hardware", Symposium on Field-Programmable Custom Computing Machines (FCCM 2002), Apr. 2002, Napa, California.
Fu et al., "The FPX KCPSM Module: An Embedded, Reconfigurable Active Processing Module for the Field Programmable Port Extender (FPX)", Washington University, Department of Computer Science, Technical Report WUCS-01-14, Jul. 2001.
Gokhale et al., "Reconfigurable Computing: Accelerating Computation With Field-Programmable Gate Arrays", 2005, pp. 1-3, 7, 11-15, 39, 92-93, Springer.

\* cited by examiner

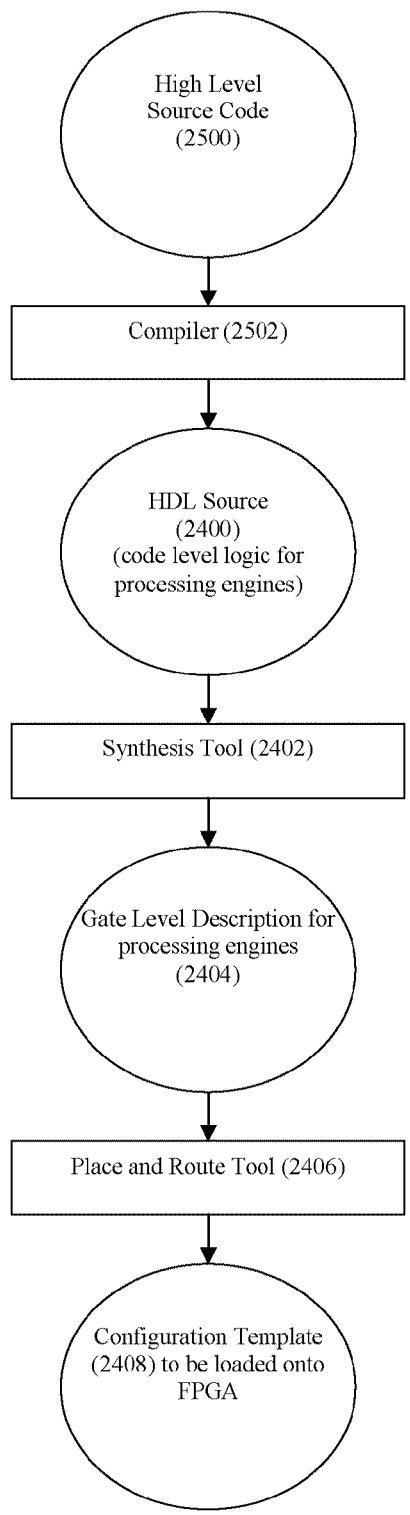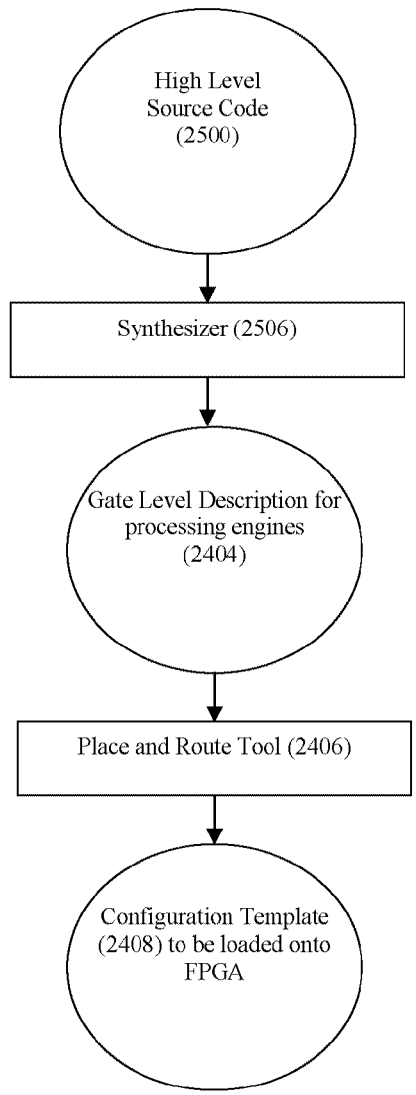
Figure 25(a)
Figure 25(b)

METHOD AND APPARATUS FOR HARDWARE-ACCELERATED ENCRYPTION/DECRYPTION

CROSS-REFERENCE AND PRIORITY CLAIM TO RELATED APPLICATIONS

This patent application is a divisional of U.S. patent application Ser. No. 12/201,259, filed Aug. 29, 2008, and entitled "Method and Apparatus for Hardware-Accelerated Encryption/Decryption", now U.S. Pat. No. 8,879,727, which claims priority to provisional U.S. patent application Ser. No. 60/969,384, filed Aug. 31, 2007, and entitled "Method and Apparatus for Hardware-Accelerated Encryption/Decryption With Integrated Key Management", the entire disclosures of each of which are incorporated herein by reference.

This patent application is related to U.S. patent application Ser. No. 11/690,034, filed Mar. 22, 2007, entitled "Method and System for High Throughput Blockwise Independent Encryption/Decryption", now U.S. Pat. No. 8,379,841, the entire disclosure of which is incorporated herein by reference.

FIELD OF THE INVENTION

The present invention relates generally to the field of data encryption/decryption, and more specifically to the field of hardware-accelerated data encryption/decryption.

BACKGROUND AND SUMMARY OF THE INVENTION

Data security is imperative for a broad spectrum of applications, particularly in the commercial and government sectors. Cryptography is one of the most trusted and widely used approaches for securing data in transit and data at rest. By obfuscating the data through a reversible transformation, encryption provides a way to ensure the confidentiality of data when the security of communication links or data storage devices cannot be guaranteed. For example, the Internet Protocol Security (IPsec) protocol encrypts IP packets, allowing confidential data to be transmitted over public IP networks.

Commercial and government organizations typically store their data using various types of Redundant Array of Independent Disks (RAID) configurations in order to maximize data availability. By partitioning data fields into small data units and striping the data blocks across parallel disk drives, RAIDs allow data to be stored and accessed faster than if it were stored on a single drive. RAIDs also provide various levels of error correction that guard against the failure of an individual drive in the array. When a drive fails, most systems allow an operator to replace the drive without interrupting the operation of the system. Some RAID configurations allow the RAID control device to automatically reconstruct the contents of the drive from the available error correction information.

While magnetic disk drives such as RAIDs represent a high-performance and relatively inexpensive medium for data storage, it should also be noted that such magnetic disk drives have a limited operational life. As such, commercial and government organizations must periodically discard old and/or failed magnetic drives. The vast stockpile of discarded and/or failed magnetic drives represents a significant security risk and liability for commercial and government enterprises. Even with failed drives, while some component of the drive may have failed, a significant amount of data may still be recovered from the magnetic disk. Drives may be sent to a destruction facility that physically grinds the drives into small pieces, but this is an expensive process and requires a significant amount of physical security measures to be implemented for the transport of the failed drives to such a facility. Encryption represents a more secure and cost effective option for securing stored data. By encrypting each data block prior writing it to disk and decrypting each data block after reading it from disk, stored data is obfuscated and protected from physical theft of the drive before or after drive failure. Cryptography may be employed in data communication and storage applications in a variety of other ways. The prior two examples simply highlight the tangible benefits. Other applications include securing digital voice, video, and image data.

A symmetric key block cipher is the most common type of cryptography employed for data confidentiality. Given a fixed-size block of input data (or plaintext) and a key, a block cipher produces a fixed-size block of encrypted output data (or ciphertext) using an unvarying transformation. A block cipher that uses the same key to encrypt and decrypt data is called a symmetric key block cipher. The Advanced Encryption Standard (AES) specified by the National Institute of Standards and Technology (NIST) is the Rijndael block cipher operating on data blocks of size 128 bits and using keys of size 128 bits, 192 bits, or 256 bits. Each transformation step in the Rijndael block cipher is referred to as a round. AES specifies the number of rounds based on the key size: 128 bit keys use 10 rounds, 192 bit keys use 12 rounds, and 256 bit keys use 14 rounds.

Despite advances in cryptographic algorithms, encryption and decryption remain computationally intensive tasks. For software applications running on general purpose processors (GPPs), adding a software implementation of encryption and decryption consumes a significant amount of processing resources, thus reducing the achievable performance of the application. One advantage of block ciphers such as AES block ciphers is their amenability to pipelined hardware implementation. In the case of AES, the inputs and processing of one round need not depend on the results of a subsequent round; i.e. there are no inherent feedback loops in the execution of the algorithm. A fully pipelined hardware implementation for AES could instantiate a series of 14 round circuits where each round circuit implements one round of the AES block cipher. An example of such an implementation is shown in FIG. 12. Depending on the key size in use, a supporting control circuit intercepts the state data at the appropriate round to be output as ciphertext. For a key size of 128 bits, the output of round 10 is used as the ciphertext. For a key size of 192 bits, the output of round 12 is used as the ciphertext. For a key size of 256 bits, the output of round 14 is used as the ciphertext. Regardless of key size, the pipelined block cipher circuit of FIG. 12 can be made to accept one block of data per clock cycle and only a single pass through the pipeline is needed to encrypt data. The resulting throughput for the circuit of FIG. 12 is the achievable clock frequency multiplied by the block size. A conservative estimate in current technology is a clock frequency of 200 MHz, resulting in a throughput of 25.6 Gbps (billion bits per second).

However, in many instances, the throughput needs of an encryption/decryption system will need to be balanced with the desired amounts of power consumption within the system. It should be noted that at higher clock frequencies and larger numbers of pipeline rounds, the power consumed by the block cipher when encrypting/decrypting data will increase. Therefore, the inventors herein believe that a need exists in the art for a block cipher design that is scalable to balance throughput goals against power consumption goals.

Toward this end, the inventors disclose as an embodiment of the invention a scalable block cipher circuit, wherein the scalable block cipher circuit is scalable to balance throughput with power consumption as desired by a practitioner of this embodiment of the invention. The scalable block circuit can be deployed on an integrated circuit, preferably as a hardware logic circuit on the integrated circuit. Optionally, this hardware logic circuit can be realized using reconfigurable logic. However, it should also be noted that this hardware logic circuit can be realized using non-reconfigurable logic (e.g., deployed as an application specific integrated circuit (ASIC)).

As used herein, "hardware logic circuit" refers to a logic circuit in which the organization of the logic is designed to specifically perform an algorithm and/or application of interest by means other than through the execution of software. For example, a GPP would not fall under the category of a hardware logic circuit because the instructions executed by the GPP to carry out an algorithm or application of interest are software instructions. As used herein, the term "GPP" refers to a hardware device that fetches instructions and executes those instructions (for example, an Intel Xeon processor or an AMD Opteron processor). Examples of hardware logic circuits include ASICs and reconfigurable logic circuits. The term "reconfigurable logic" refers to any logic technology whose form and function can be significantly altered (i.e., reconfigured) in the field post-manufacture. This is to be contrasted with a GPP, whose function can change post-manufacture, but whose form is fixed at manufacture. This can also be contrasted with those hardware logic circuits whose logic is not reconfigurable, in which case both the form and the function are fixed at manufacture (e.g., an ASIC, as mentioned above). An example of a reconfigurable logic circuit is a field programmable gate array (FPGA). Furthermore, the term "firmware" refers to data processing functionality that is deployed in a hardware logic circuit such as an ASIC or FPGA. The term "software" will refer to data processing functionality that is deployed on a GPP.

As another embodiment, the inventors disclose a block cipher circuit comprising a plurality of pipelined round circuits, wherein the block cipher circuit is configured to perform encryption and decryption utilizing the same order of round circuits within the pipeline regardless of whether encryption or decryption is being performed. Furthermore, such a block cipher circuit can employ multiplexers within a plurality of the round circuits to adjust the order of stages within each round circuit to accommodate both encryption and decryption operations. Further still, such a block circuit can employ on-the-fly key expansion and inverse expansion.

While the use of a strong block cipher, a large key size, and a clever encryption mode significantly reduces the probability of a successful attack on ciphertext, it should also be noted that key management is of equal importance in protecting the security of encrypted data. Key management represents one of the most challenging aspects of data security. As used herein, "key management" refers to the process of selecting, generating, authenticating, distributing, updating, and storing the keys used by a block cipher for encrypting/decrypting data. As used herein, "key management function" refers to a specific key management task (e.g., key generation, key distribution, etc.).

To address a perceived need in the art for improved key management security, the inventors disclose as an embodiment of the invention an integrated circuit configured to perform encryption/decryption, wherein the integrated circuit is also configured to perform a plurality of different types of key management functions (e.g., key management functions such as key selection, key generation, key authentication, key distribution, and key storage). The inventors also note that a challenge to integrating multiple type of key management functions into a single integrated circuit is the constraint as to the amount of space available on the integrated circuit. Thus, an efficient design for integrated key management is needed such as the inventive embodiments disclosed herein.

Further still, to increase the flexibility of encryption/decryption, the inventors disclose as an embodiment of the invention an integrated circuit configured to perform encryption/decryption wherein an encryption mode wrapper circuit is included on the integrated circuit for selectively performing additional operations on data going to and/or coming from the block cipher circuit to thereby define a desired encryption mode for the encryption operation. Preferably, the encryption mode wrapper circuit is realized as a hardware logic circuit on the integrated circuit.

Further still, the inventors disclose as an embodiment of the invention an integrated circuit configured to perform encryption/decryption wherein a data routing and control circuit is included on the integrated circuit for performing various data routing and control functions among the various circuits that are also included on the integrated circuit. Preferably, the data routing and control circuit is realized as a hardware logic circuit on the integrated circuit.

Further still, the inventors disclose as an embodiment of the invention an integrated circuit configured to perform encryption/decryption wherein volatile memory is included on the integrated circuit for temporarily storing any plaintext data that is needed by the integrated circuit during its operation, to thereby prevent exposure of plaintext outside the integrated circuit.

Further still, the inventors disclose as an embodiment of the invention an integrated circuit configured to perform encryption/decryption wherein volatile memory is included on the integrated circuit for temporarily storing any keys used by the block cipher circuit to encrypt/decrypt data, to thereby prevent exposure of the actual keys used by the block cipher for encryption/decryption outside the integrated circuit.

Further still, the inventors disclose as an embodiment of the invention an integrated circuit configured to perform encryption/decryption and a plurality of different types of key management functions, wherein the integrated circuit comprises a scalable block cipher circuit, an encryption mode wrapper circuit, a data routing and control circuit, and volatile memory for storing data and keys. Preferably, these circuits are realized as hardware logic circuits on the integrated circuit. The integrated circuit can also include a Direct Memory Access (DMA) engine circuit for reading data and commands into and writing data and commands out of the integrated circuit. The DMA engine circuit may also preferably be realized as a hardware logic circuit.

These and other features, advantages, and embodiments of the present invention will be apparent to those having ordinary skill in the art upon review of the following drawings and detailed description.

BRIEF DESCRIPTION OF THE DRAWINGS

FIGS. 24, 25(a) and 25(b) depict exemplary process flows for creating a template to be loaded onto hardware logic for an integrated circuit to define one more hardware logic circuits thereon.

DETAILED DESCRIPTION OF THE PREFERRED EMBODIMENTS

Figure 1:
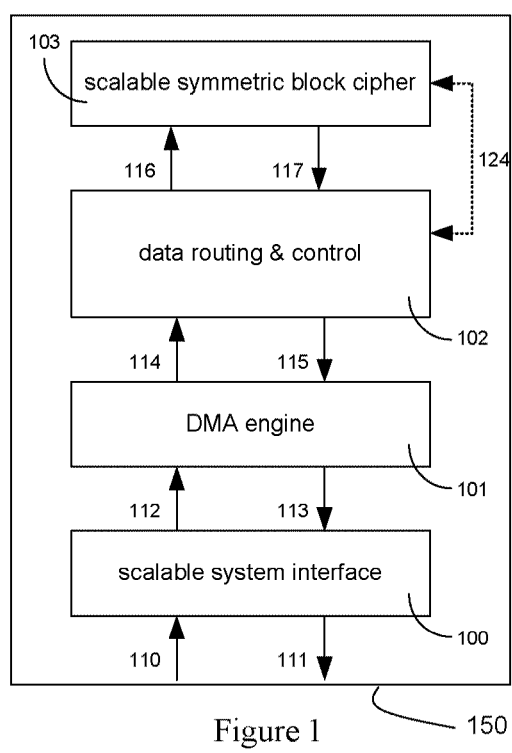
FIG. 1 depicts an integrated circuit configured to perform encryption/decryption utilizing a scalable block cipher circuit.

FIG. 1 depicts an integrated circuit (IC) 150 that includes a block cipher circuit 103, a data routing and control circuit 102, a Direct Memory Access (DMA) engine circuit 101, and a scalable system interface circuit 100. Integrating these functions into a single IC 150 completely offloads the encryption and decryption tasks from other components in a system within which the IC 150 resides, thereby freeing up system resources to improve system performance or support additional tasks. The IC 150 also increases the security of the system by never exposing intermediate encryption results outside of the IC 150. The combination of the scalable system interface circuit 100 and DMA engine circuit 101 enables the IC 150 to be easily combined with a wide variety of processing architectures. This combination also allows the system interface to be easily scaled to match the performance requirements of the system and the block cipher circuit 103.

An example of a suitable platform upon which the IC 150 can be deployed in described in the above-referenced and incorporated U.S. Patent Application Publication 2007/0237327. However, it should be understood that other platforms could be used.

I. Block Cipher Circuit:

As one embodiment for the block cipher circuit 103, the inventors disclose a scalable block cipher circuit for inclusion in the IC 150. Preferably, this scalable block cipher circuit comprises scalable symmetric key block cipher circuit that comprises a plurality of pipelined round circuits for encryption/decryption, wherein the number of pipelined round circuits is specified at design time. Any block cipher encryption technique that is amenable to hardware implementation can be used for the scalable block cipher circuit, such as the triple data encryption algorithm (TDEA) and the AES algorithm. Block cipher circuits with fewer round circuits than the number of required rounds for the given key size require the data to make multiple passes through the circuit. For example, FIG. 13(a) shows a scalable AES block cipher circuit 1300 with seven round circuits 1302 where data must make two passes to encrypt/decrypt regardless of key size (e.g., whether the key size is 128/192/256 bits). As such, each round circuit 1302 can perform operations for multiple rounds of the encryption/decryption process, as denoted in FIG. 13(a), wherein the different rounds that each round circuit 1302 performs is depicted on each round circuit 1302. On average, circuit 1300 is able to accept a new data block 1308 every two clock cycles. Assuming a fixed clock frequency, this necessarily reduces the throughput of the circuit by a factor of two relative to the block cipher circuit of FIG. 12. The ability to scale the pipelined circuit with respect to its number of rounds 1302 allows the system to meet a given throughput goal while minimizing circuit size, cost, and power consumption.

In a preferred embodiment, the scalable block cipher circuit 103 is a hardware logic circuit. As examples, this hardware logic circuit can be deployed in reconfigurable logic or nonreconfigurable logic.

For systems with variable performance requirements, the circuit 1300 may be scaled to meet the maximum throughput goal. In situations where the throughput goal is reduced, the number of active round circuits 1302 may be reduced by disabling the clock to the round circuits 1302 at the end of the pipeline and feeding back the output of the last active round circuit 1302. This allows the system to minimize power consumption while retaining the ability to increase circuit throughput based on system demands.

Preferably, the scalable block cipher circuit is configured for either or both of two types of scaling: design-time scaling and run-time scaling. Design-time scaling allows the system designer to specify the depth of the processing pipeline in order to achieve a maximum throughput performance metric. In general, increasing the depth of the processing pipeline increases the maximum throughput of the block cipher. The system designer may choose the minimum pipeline depth that achieves a given performance metric. Reducing the depth of the pipeline reduces the size and dynamic power consumption of the block cipher circuit. Run-time scaling allows the system to dynamically adjust the depth of the pipeline by disabling pipeline round circuits. This allows the system to actively manage power consumption while retaining the ability to increase system throughput when necessary.

Figure 12:
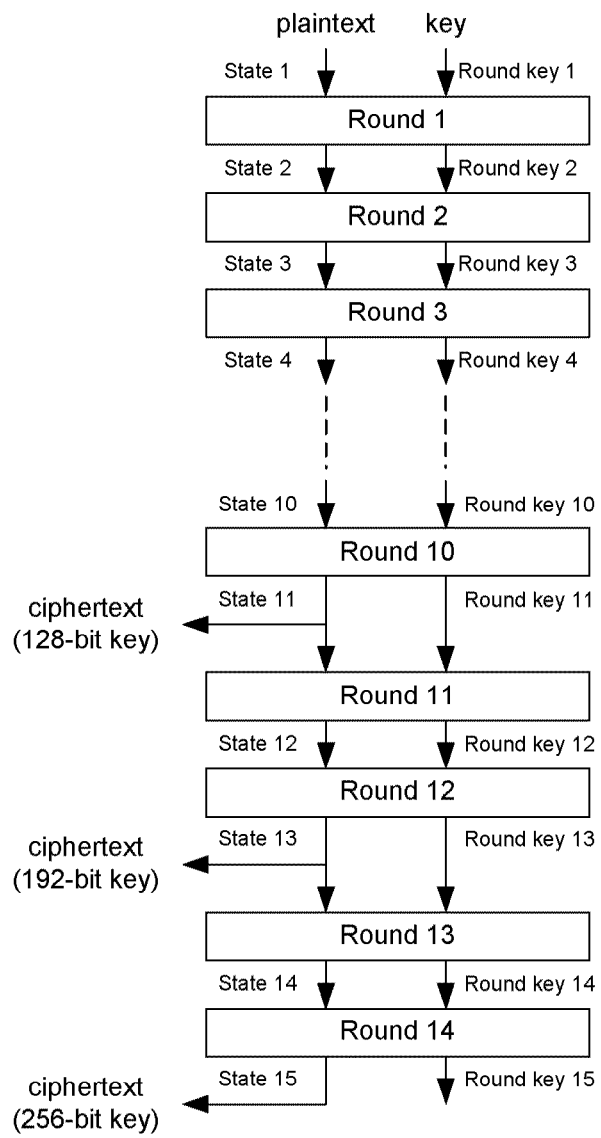
FIG. 12 depicts an exemplary AES block cipher circuit that is fully pipelined.
Figure 13A:
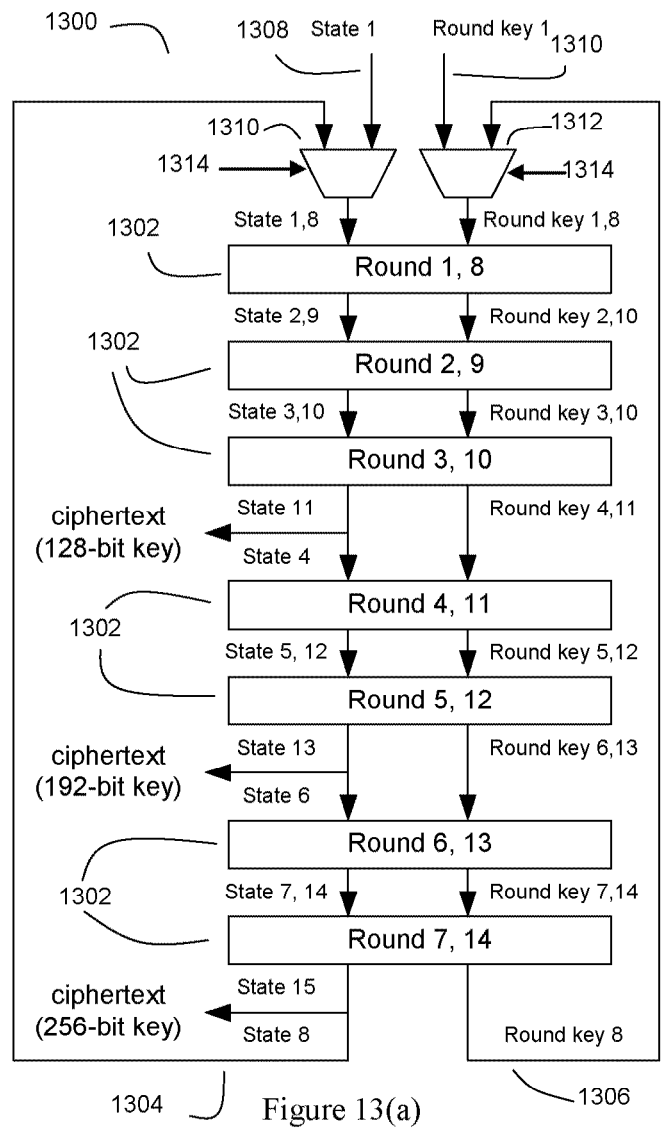
FIG. 13(a) depicts an exemplary scalable AES block cipher circuit that employs pipelining and feedback.

An example of a run-time scalable block cipher circuit would include a pipeline such as that shown in FIG. 12 or 13, but where there are feedback loops to the pipeline entry from the output of each round circuit to thereby allow the block cipher circuit to be scaled at run-time as desired based on which round circuit output is fed back. Two exemplary approaches that could be used for operating such a run-time scalable block cipher circuit are a tri-state bus for the feedback path and clock enable propagation. With clock enable propagation, one could accept a certain number of words per cycle, then propagate the clock enable signal along with the data, thereby eliminating the need for additional tri-state buffers or multiplexers.

Figure 13B:
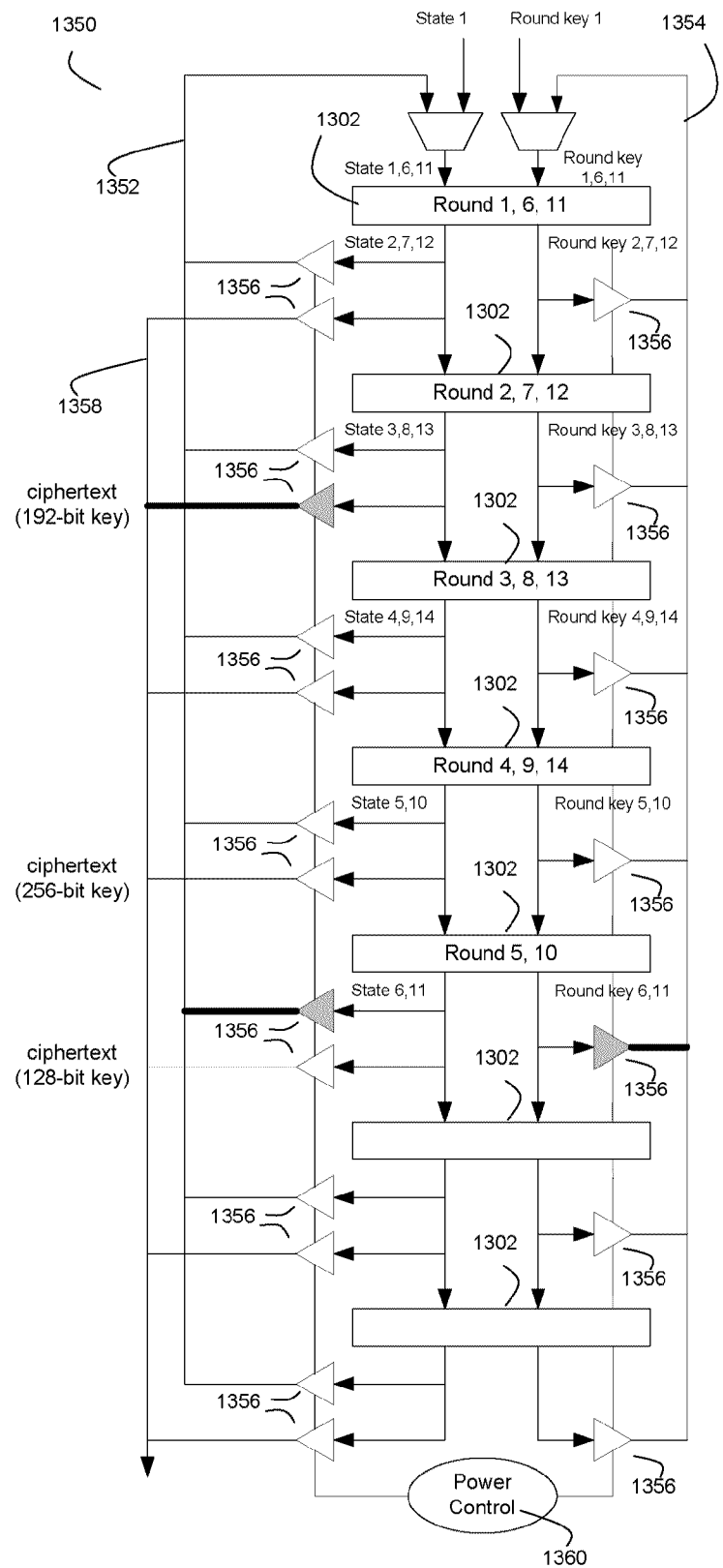
FIG. 13(b) depicts an exemplary scalable AES block cipher circuit that employs pipelining and feedback with run-time scaling.

FIG. 13(b) depicts an exemplary run-time scalable block cipher circuit 1350 which can operate to reduce the number of active round circuits 1302 at run time. The data state and round key outputs from each round circuit 1302 are connected to the data state and round key feedback buses 1352 and 1354 respectively via tri-state buffers 1356. When a buffer 1356 is enabled, that buffer drives its input value on the bus. When a buffer 1356 is not enabled, that buffer's input is disconnected from the bus. Similarly, the data state output of each round circuit is also connected to an output bus 1358. A power control circuit 1360 controls the enable signals to each tri-state buffer 1356, wherein these enable signals can be defined at run-time for the block cipher circuit 1350. In the example of FIG. 13(b), the power control circuit 1360 operates to enable 5 rounds of the 7 round pipeline (as shown by the highlighted tri-state buffers 1356 connected to the outputs of the fifth round circuit 1302). Furthermore, in this example, a 192-bit key is used, which therefore means that the data output of the $12^{th}$ round forms the cipher text. Thus, the power control circuit 1360 also operates to enable the tri-state buffer connected to the output of the second round circuit 1302 to drive bus 1358 when round 12 is completed (as shown by the highlighted tri-state buffer 1356 connected to the data output of the second round circuit 1302).

Data may be scheduled for input into the block cipher circuit 1300 in multiple ways. One mechanism is to use fixed time slot scheduling where input data 1308 is accepted on the first timing cycle. In general, the number of timing cycles is equal to the number of passes required to produce output ciphertext given the pipeline depth and the key size. In the configuration shown in FIG. 13(a), the number of timing cycles is two; input data 1308 and input key 1310 (state 1, round key 1) is accepted on the first timing cycle and first pass data 1304 and first pass key 1306 (state 8, round key 8) is accepted on the second timing cycle, then the cycle repeats. The multiplexers 1310 and 1312 at the head of the pipeline select input data and round keys on the first timing cycle, and feedback data and round keys on subsequent timing cycles, as specified by a command signal 1314 from control circuitry within the block cipher circuit. The fixed time slot scheduling approach allows the circuit 1300 to achieve a consistent data ingest rate.

Another mechanism for input data scheduling in multi-pass implementations is to dynamically multiplex data and keys into the first round, giving priority to data and keys on the feedback path (1304/1306). Data valid signals can be used to denote valid data on the input path (1308/1310) and the feedback path (1304/1306). On each clock cycle, these signals can be used in simple combinational logic to control the multiplexers 1310 and 1312 at the head of the pipeline. This approach allows contiguous input plaintext blocks to be ingested by the pipeline until the pipeline is full. It does require the ability to pause and possibly buffer the input data stream until the data in the pipeline completes its second pass.

As the number of pipeline round circuits 1302 decreases, the number of passes required diverges for different key sizes. For example, a pipeline depth of five requires two passes for 128 bit keys, but three passes for 192 bit and 256 bit keys. In general, design-time scaling allows the AES block cipher pipeline depth to range from 1 to 14. One mechanism for achieving design-time scaling is through the use of parameterized Hardware Description Language (HDL) code. Parameters in the code can be used to specify the pipeline depth. Conditional statements including those parameters can be used to instantiate the necessary round circuits and supporting control logic.

Figure 19A:
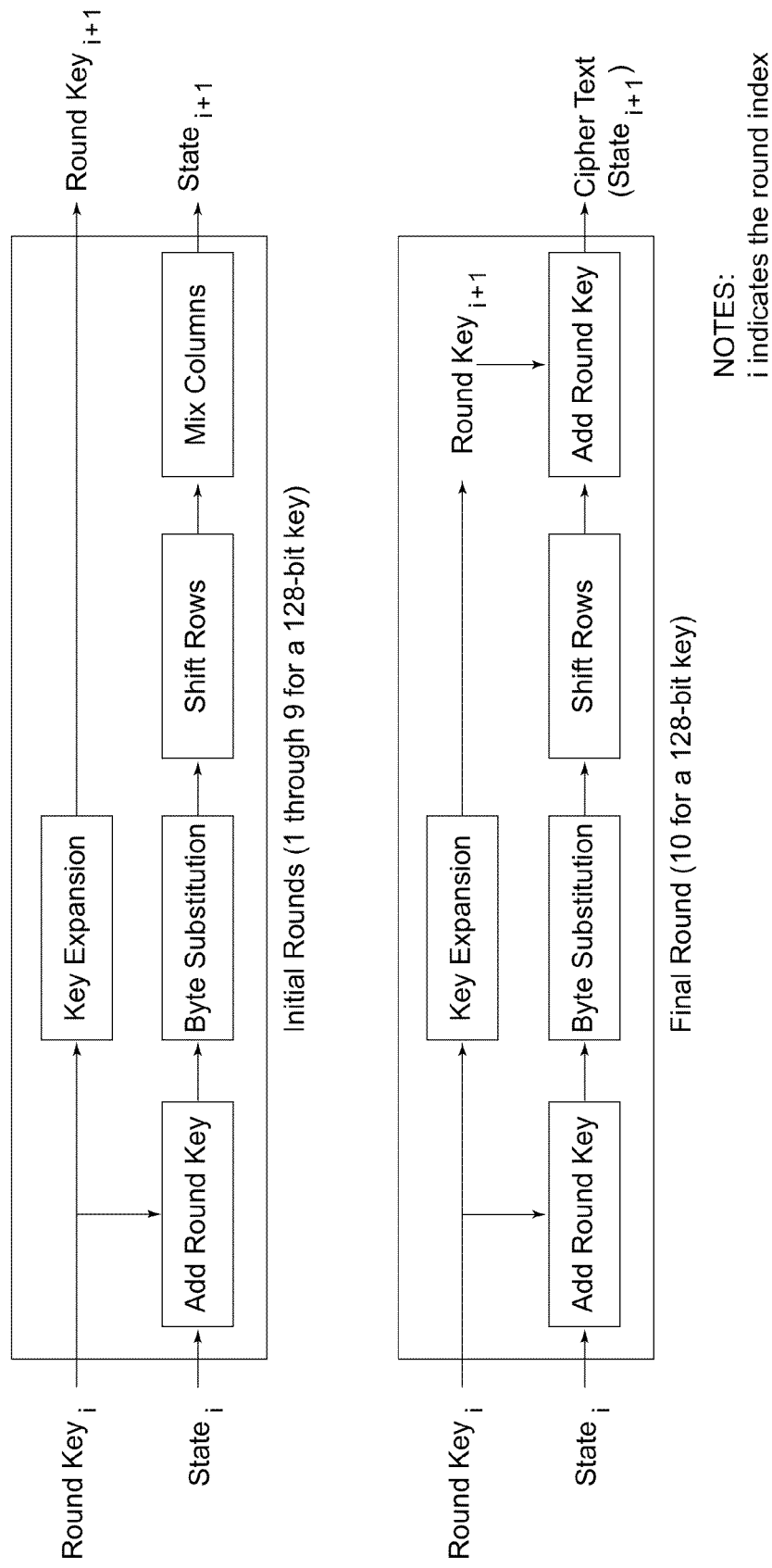
FIGS. 19(a) and (b) depict a conventional ordering of stages within AES rounds for encrypting and decrypting data respectively with an AES block cipher circuit.
Figure 19B:
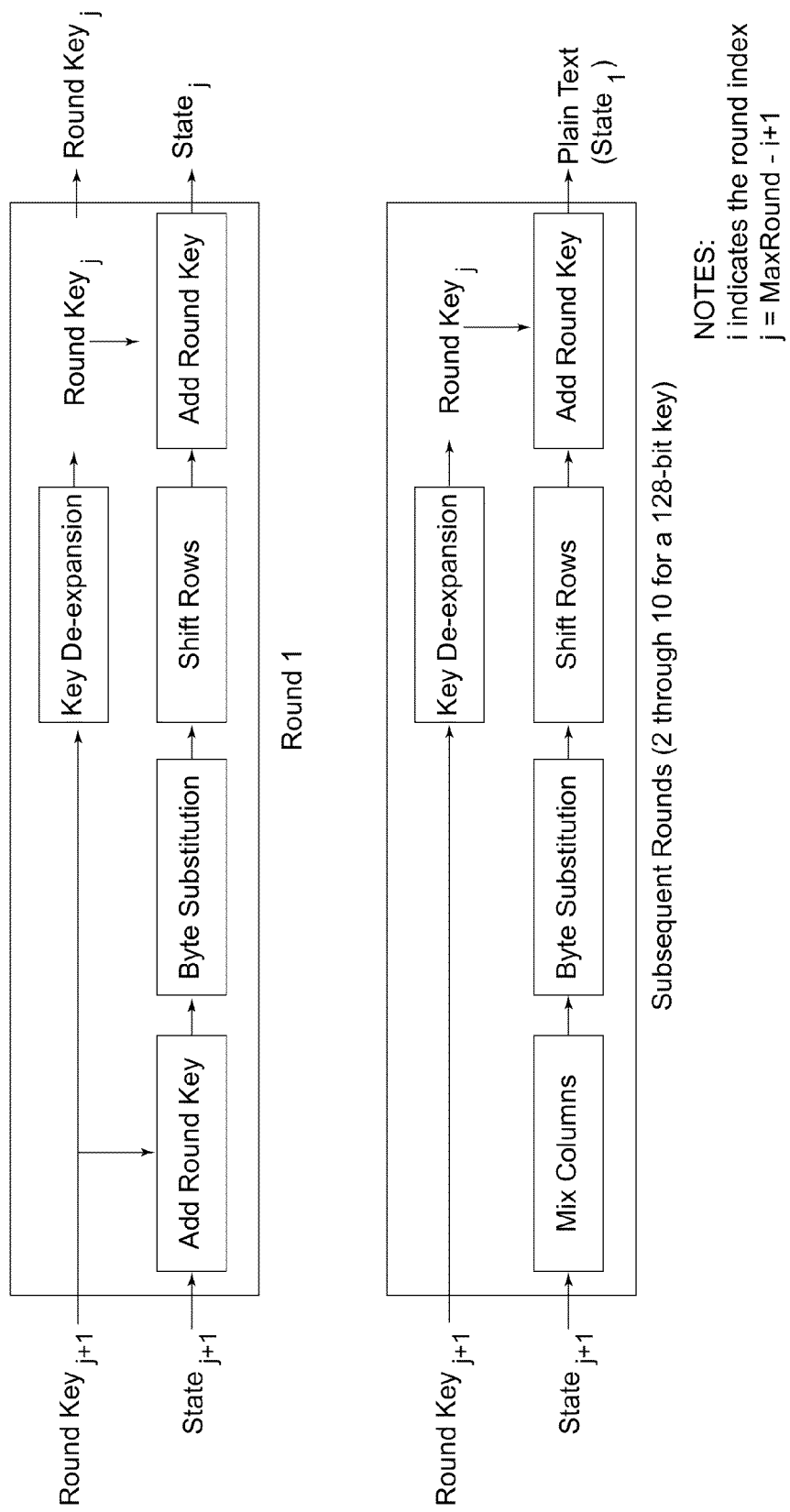

In order to provide the scalability described above, the block cipher circuit 103 can employ a novel design that supports encryption and decryption from a single circuit and implements on-the-fly key expansion for round key generation. An exemplary algorithm such as the AES algorithm involves rounds composed of four key stages: round key addition, byte substitution, shifting of rows, and mixing of columns. For encryption and decryption, each round consists of the same stages arranged differently. FIG. 19(a) shows the ordering of stages in each round for the encryption process. Note that the order of stages differs for the last round; the final mix columns stage is replaced with an add round key stage. FIG. 19(b) shows the order of stages in each round for the decryption process. Note that the order of stages differs for the first round; the mix columns stage is replaced by an add round key stage.

Figure 20:
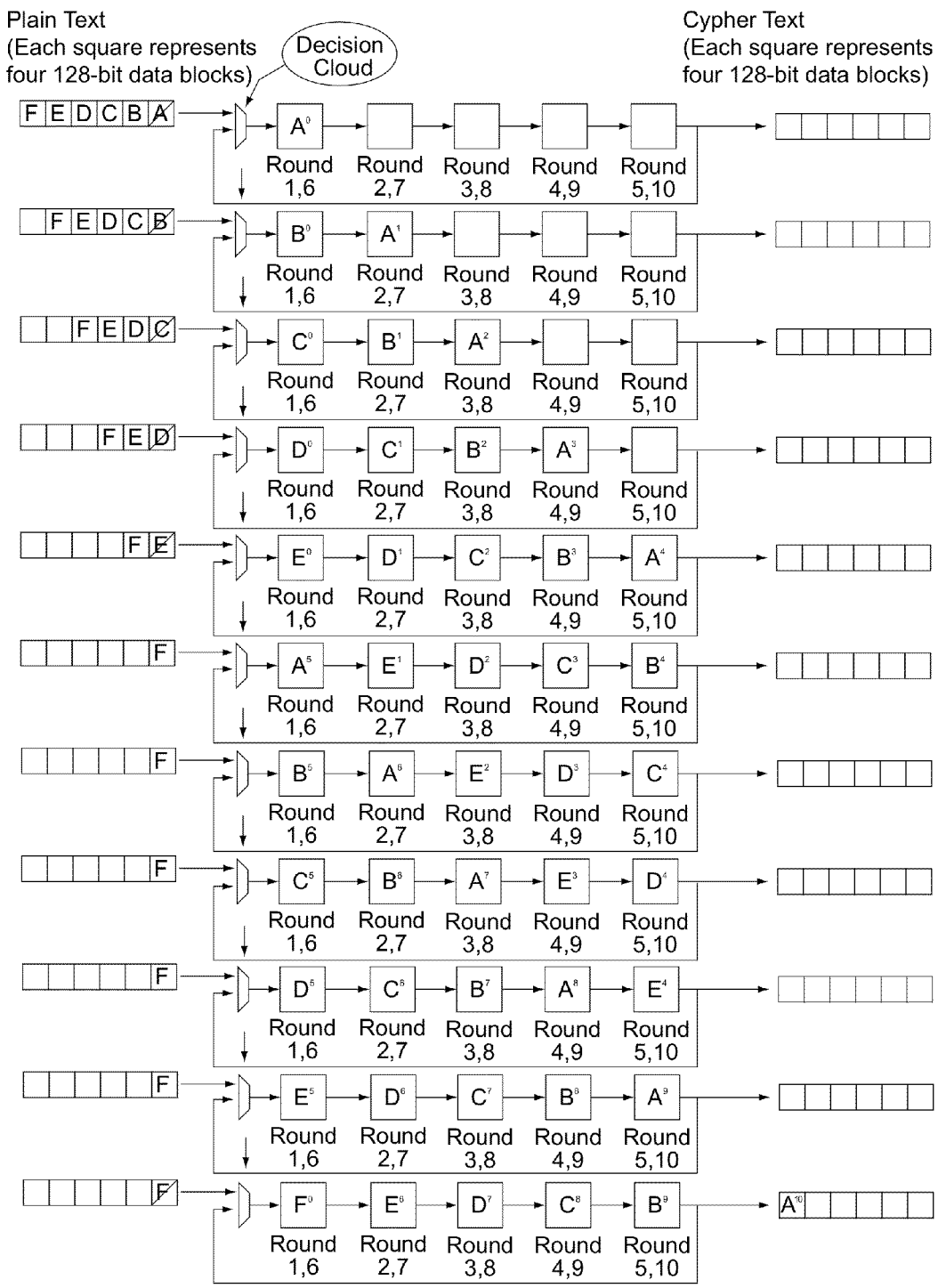
FIG. 20 depicts a sequential diagram that illustrates how data blocks can be processed through a pipelined scalable block cipher circuit having a depth of 5 rounds.

In order to maximize circuit utilization and minimize area and power consumption, the block cipher circuit 103 can include one instance of each stage per round to handle both encryption and decryption. Meta-information accompanies the data as it passes from round to round and from stage to stage within a round. The meta-information supplies the parameters of the desired AES operation. Included among exemplary meta-information are: the round key, key size, whether encrypting or decrypting, as well as an index of the current round. It is worth noting that, as a data block completes a round, the round key will have been expanded for the next round and the current round index will be incremented. The presence of meta-information reduces latency by allowing each round to operate under different parameters, rather than requiring the entire pipeline to operate under the same parameters until the completion of the specified operation. This is also what enables the AES circuit to be constructed with the variable depth round pipeline as previously discussed. Data leaving the last instantiated round of the pipeline could need to be looped back to the beginning of the pipeline, while new data could also be ready to enter the pipeline. The parameters of these two data states may vary greatly, if by nothing other than their respective round keys. When determining what data enters the pipeline, precedence is given to data needing to be looped through the pipeline. However, in an effort to fully utilize the pipeline (and therefore reduce latency) new data may enter the pipeline when no data is ready for an additional pass through the pipeline. An example is provided in FIG. 20. In this instance a five-round deep pipeline is to be used to encrypt a 3 Kb file with a fixed 128-bit key, thus ten rounds will be required to encrypt twenty-four 128-bit blocks. This figure is not meant to serve as a timing diagram, it is only to illustrate the use of meta-information. Since each round consists of four pipelined stages, it is possible for a round to include four 128-bit data blocks. The example also does not show the effect of stalls on the round pipeline. A 3 Kb file was chosen since this will ensure that a decision will be made concerning the propagation of new data and data requiring an additional pass through the circuit. A superscript is placed on the parameters to indicate the round in which they were produced; a superscript of zero signifies the initial value. In FIG. 20, the blocks will be output from the pipeline as they complete their second pass. Note that block F requires a second pass and will be looped back to the first round pipeline stage.

Figure 21A:
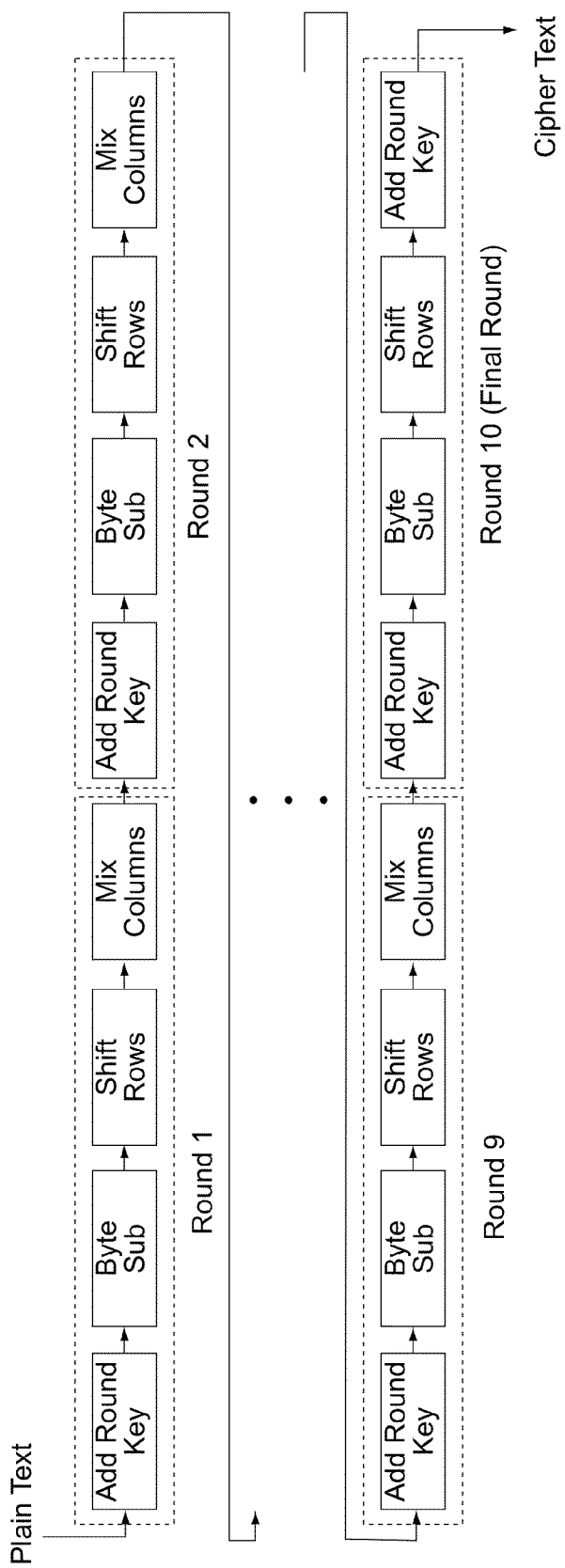
FIGS. 21(a) and (b) depict a conventional view of AES encryption and decryption respectively, including the order of stages within rounds.
Figure 21B:
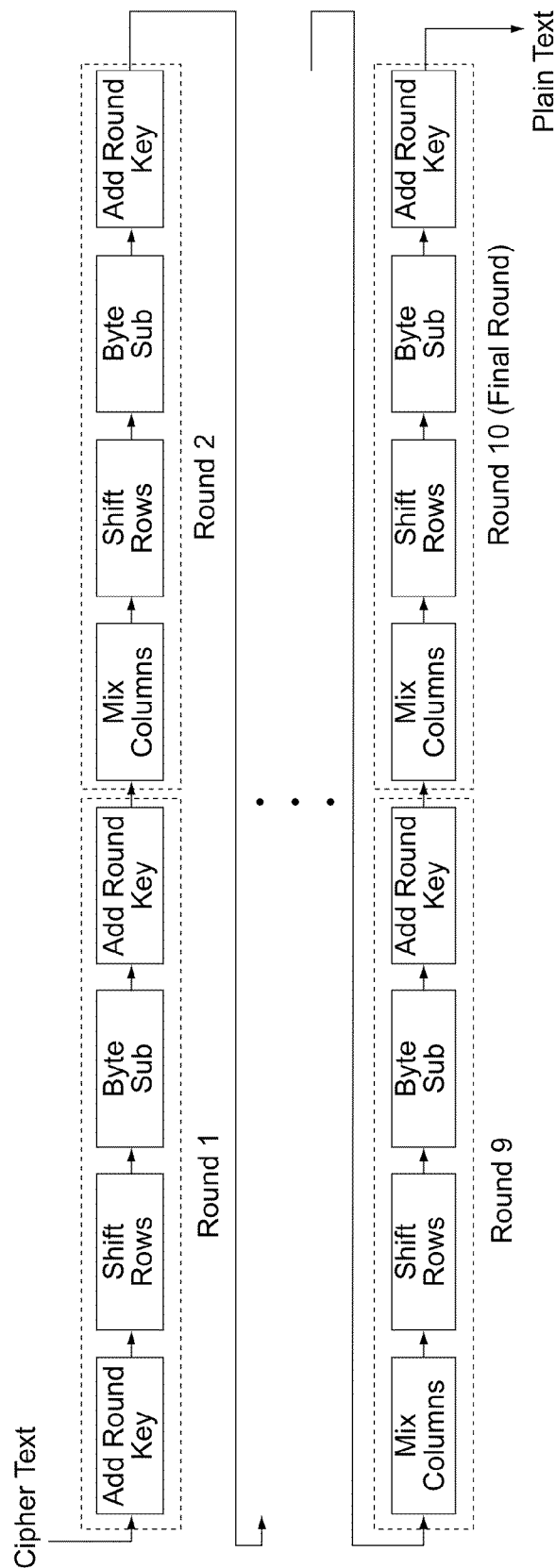

FIGS. 21(*a*) and 21(*b*) show the standard view of AES encryption and decryption. The figures show a ten-round, 128-bit key size, implementation, although the underlying concept of a round is applicable for all key sizes. By design, AES decryption is AES encryption in reverse. This presents two principle obstacles to having encryption and decryption coalesced in a single circuit. Most notably, the order of operations within a round is reversed from encryption to decryption. Furthermore, the last round of encryption is unique in that it does not utilize a mix columns stage in favor of an additional add round key stage. The final round of encryption is treated as a special case, however this requires that the first round of decryption be treated as a special case. Special cases and multiple possible data paths can quickly bloat the logic resources required to finalize a design in hardware.

Figure 22A:
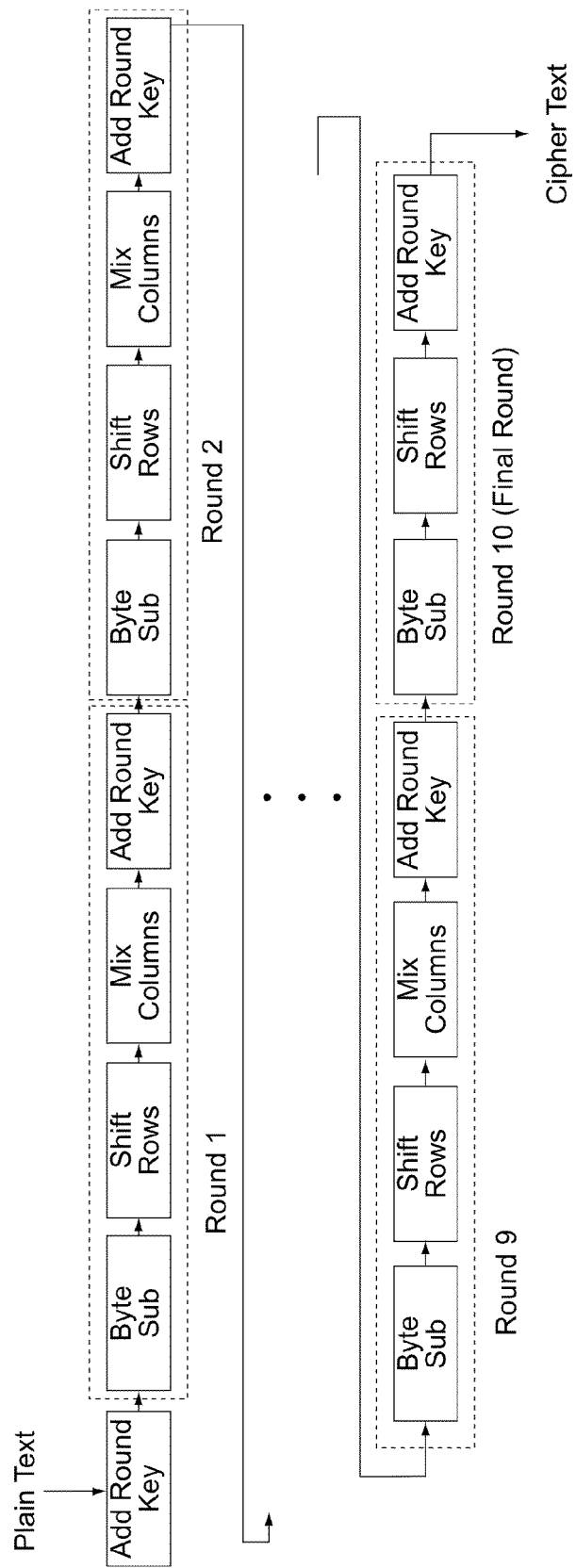
FIGS. 22(a) and (b) depict the composition of rounds for a preferred embodiment of the block cipher circuit.
Figure 22B:
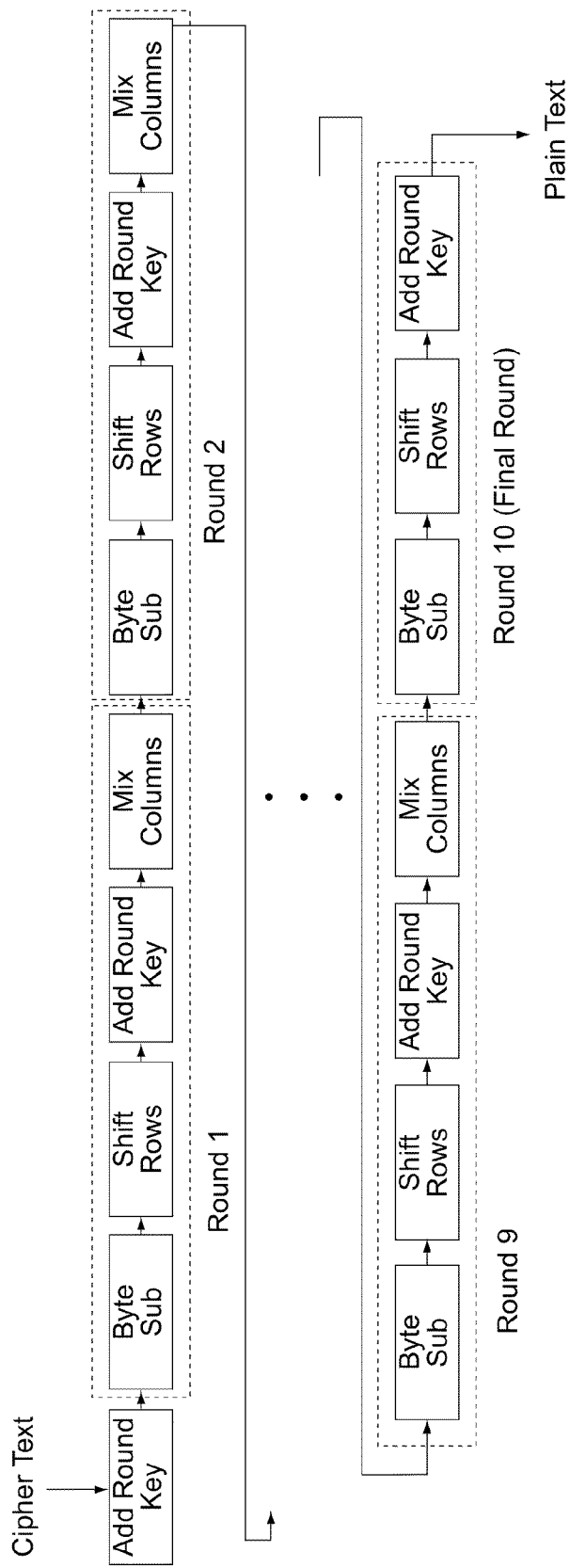

To alleviate these limitations, a new notion of an AES round was formulated for a preferred embodiment of a scalable block cipher circuit. It is worth noting that the byte substitution and shifting of rows stages are interchangeable. The byte substitution stage is the direct mapping of each byte in the state to a corresponding fixed and predefined value, while the shifting of rows stage involves rotating the rows of the state based on the row number. Therefore, the order of these stages is irrelevant. The inventors further note that the byte substitution and shifting of rows stages could be combined into a single stage, along with universally shifting the grouping of stages to comprise a round. An embodiment of a scalable block cipher circuit can thus make use of the interchangeability of the byte substitution and the shifting of rows stages to conceptually "shift" the round boundaries in order to achieve a more consistent ordering of stages for both encryption and decryption. Due to this shifting, an initial add round key stage must be performed prior to entering the circuit's round pipeline. In a preferred embodiment for the scalable block cipher circuit, the special case round is now reserved for the last round when encrypting as well as when decrypting. FIGS. 22(*a*) and 22(*b*) illustrate the composition of rounds for a preferred embodiment of the scalable block cipher circuit. Thus, the order of the round circuits in the block cipher circuit of FIGS. 22(*a*) and (*b*) is fully independent with respect to whether encryption or decryption is performed.

Figure 23:
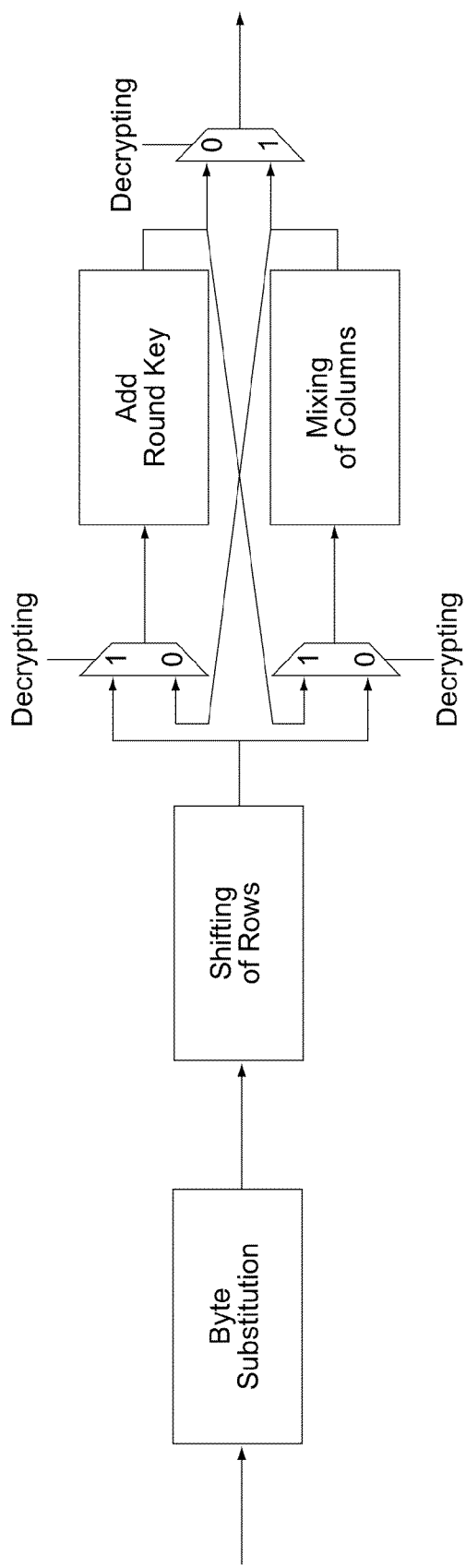
FIG. 23 depicts an exemplary round for a preferred embodiment of the block cipher circuit wherein the order of the column mixing stage and the add round key stage can be adjusted based on whether the round is to perform encryption or decryption.

By adopting the shifted view of an AES round, encryption and decryption begin to correlate and exhibit a design that is more befitting to hardware logic implementation. It is apparent that the order of the mix columns and add round key stages within a round are dependent upon whether the data block is being encrypted or decrypted. It is fairly straightforward in hardware to deploy multiplexers to allow for a single instantiation of each stage within a round, as shown in FIG. 23. A multiplexer placed in front of each of these stages can accept data (and meta-information) from the shifting of rows stage as well as from the output of the other stage. It is also necessary to feed each of these stages output to another multiplexer to determine the final output to exit the round. Each multiplexer determines which data to use based on whether the current round is encrypting or decrypting. This is an improvement over the standard view of an AES round, since the standard view would require that this configuration of multiplexers be duplicated at the head and tail of each round; thus requiring the instantiation of multiple mix columns and add round key stages within each round.

Each round of the block cipher requires a round key be derived from the original key by a defined technique for key expansion. A round key is 128-bits, regardless of specified key size, since it is to be applied to the 128-bit state of the round. For encryption, the round key of the first round is taken directly from the original key. Subsequent round keys are computed from the previous round key through a combination of exclusive-or operations, logical rotations, and byte substitutions. Key expansion also involves an exponentiation of 2, where the degree depends on the round. This is where the round index from the meta-information comes into play. The round index is also used, along with a maximum round value derived from the key size, to signal when execution is complete and the data block is ready to exit the AES pipeline.

A preferred embodiment of the block cipher circuit can also perform on-the-fly key expansion. The round key is only utilized in the round key addition stage of each round. By pipelining the layout of the block cipher, round keys may be expanded (or de-expanded in the case of decryption) within the round, prior to the round key addition stage. This requires that the initial encryption key be fed to the first round, and all necessary round keys will be expanded within the circuit. This improves latency for encryption since the AES circuit can begin executing immediately without waiting for the key to be pre-expanded.

Decryption is encryption in reverse, so the initial round key for decryption is the tail of the expanded encryption key. Utilizing similar techniques, a preferred embodiment of the block cipher circuit can also provide on-the-fly key expansion as well as on-the-fly key de-expansion. With such an embodiment, each encryption key, loaded into a key table by a key management processor (as explained hereinafter with respect to FIG. 3), will also have a corresponding decryption key loaded into the key table. This would involve expanding the encryption key based on the specified key size. The key management processor (which may be embodied as a hardware logic circuit) could handle this and load both the encryption and decryption key into the key table. Since key expansion in no way involves the cipher data, a relatively small sub-module could be implemented in hardware to arrive at a decryption key upon the loading of an encryption key to the key table.

II. Scalable System Interface Circuit:

In order to greatly simplify the integration of the scalable symmetric key block cipher circuit 1300 into standard system architectures, the inventors also disclose an IC 150 that includes a scalable system interface circuit 100. In general, the scalable system interface circuit 100 may be selected at design-time to be any standard or custom interface core. Its primary function is to act as a protocol bridge that presents a standard interface to the DMA engine circuit 101. Examples of system interface protocols include PCI, PCI-X, PCI Express, HyperTransport, and Infiniband. Some standard interface protocols such as PCI Express include scalability across a spectrum of performance points. The PCI Express protocol allows the number of 2.5 Gb/s bi-directional links to be 1, 4, 8, or 16. This allows the throughput of the system interface core to be scaled to match the throughput of the scalable block cipher. Given a system throughput goal, this scalability allows the integrated circuit to achieve minimum size and power consumption.

With reference to FIG. 1, input data flows across the input system interface 110, through the scalable system interface circuit 100, and across the DMA engine input interface 112. Output data is passed from the DMA engine output interface 113, through the scalable system interface circuit 100, and across the output system interface 111.

In a preferred embodiment, the scalable system interface circuit 100 is a hardware logic circuit. As examples, this hardware logic circuit can be deployed in reconfigurable logic or nonreconfigurable logic.

III. DMA Engine Circuit:

The DMA engine circuit 101 provides a mechanism for transferring data to and from the integrated circuit using memory transaction semantics. These memory transaction semantics provide flexibility in defining protocols for exchanging data and commands between the IC 150 and other system components. In a preferred embodiment, the DMA engine circuit 101 is a hardware logic circuit. As examples, this hardware logic circuit can be deployed in reconfigurable logic or nonreconfigurable logic.

The DMA engine circuit 101 preferably contains a set of configuration registers that are assigned a system address range at system initialization. These extensible registers define circuit configurations, specify the location of data buffer descriptors, and control the assertion of interrupts to the system. In addition to presenting a standard memory transaction interface to other system components, the DMA engine circuit 101 presents a standard data and command transfer interface to the data routing and control circuit 102. An example of a DMA engine circuit 101 that can be used in the practice of a preferred embodiment is the firmware socket module disclosed in pending U.S. patent application Ser. No. 11/339,892, filed Jan. 26, 2006, entitled "Firmware Socket Module for FPGA-Based Pipeline Processing", and published as U.S. Patent Application Publication 2007/0174841, the entire disclosure of which is incorporated herein by reference. While a preferred embodiment disclosed in the Ser. No. 11/339,892 application is for deployment on an FPGA, the firmware socket module disclosed therein could also be used for deployment on other devices, including ASICs, as would be understood by those having ordinary skill in the art.

With reference to FIG. 1, input commands and data are passed from the DMA engine circuit 101 to the data routing and control circuit 102 across interface 114. Output commands and data are passed from the data routing and control circuit 102 to the DMA engine circuit 101 across interface 115.

IV. Data Routing and Control Circuit:

The data routing and control circuit 102 manages data destined for to and emanating from the scalable symmetric block cipher circuit 103. Functions for the data routing and control circuit 102 include processing commands that direct the IC 150 to load a key, set the key size, encrypt data, and decrypt data. With reference to the embodiment of FIG. 1, input plaintext blocks and keys are passed to the scalable symmetric block cipher circuit 103 across input interface 116, and output ciphertext blocks are passed from the scalable symmetric block cipher circuit 103 to the data routing and control circuit 102 across interface 117. Keys and control signals and passed between the data routing and control circuit 102 and the scalable symmetric block cipher circuit 103 across interface 124.

In a preferred embodiment, the data routing and control circuit 102 is a hardware logic circuit. As examples, this hardware logic circuit can be deployed in reconfigurable logic or nonreconfigurable logic.

V. Encryption Mode Wrapper Circuit:

Encryption modes generally define additional transformations to apply to the inputs and outputs of a block cipher. Modes are typically used to improve security, but may also be used to improve performance or extend functionality by addition authentication. Examples of encryption modes include cyclic block chaining (CBC), tweakable storage cipher (LRW and XTS), counter (CTR), and others. An example of such "other" encryption modes is the encryption technique disclosed in the above-referenced and incorporated U.S. Patent Application Publication 2007/0237327, entitled "Method and System for High Throughput Blockwise Independent Encryption/Decryption". Another example of an encryption mode is the electronic code book (ECB) mode of encryption, wherein the output of a symmetric key block cipher is directly utilized as the ciphertext. However, relative to other encryption modes, with ECB, no additional transformations on the inputs and outputs of the block cipher are needed.

Figure 2A:
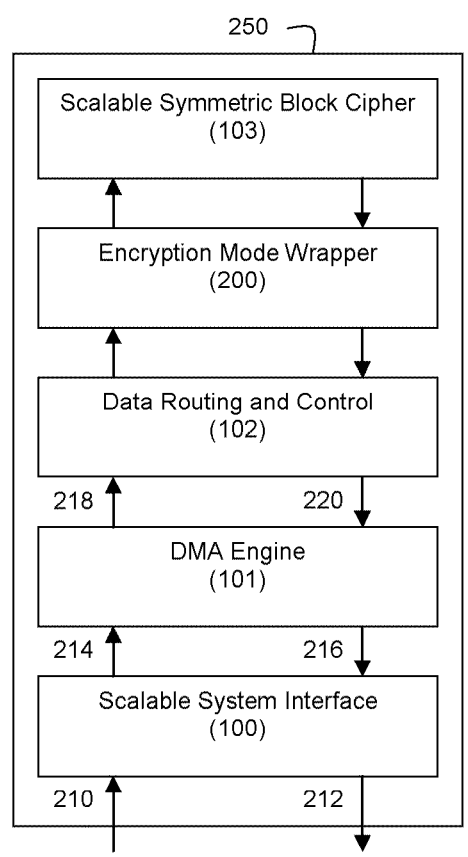
FIG. 2(a) depicts the integrated circuit of FIG. 1 enhanced with an encryption mode wrapper circuit.

FIG. 2(a) depicts an IC 250 wherein an encryption mode wrapper circuit 200 is in communication with the inputs and outputs of the scalable block cipher circuit 103 to selectively define an encryption mode from a plurality of possible encryption modes for IC 250. Based on a control signal over interface 302 from the data routing and control circuit 102, the encryption mode wrapper circuit can select which additional transformations will (or will not in the case of ECB) be performed on the input to and/or output from the block cipher circuit 103. In a preferred embodiment, the encryption mode wrapper circuit 200 is a hardware logic circuit. As examples, this hardware logic circuit can be deployed in reconfigurable logic or nonreconfigurable logic.

Figure 14:
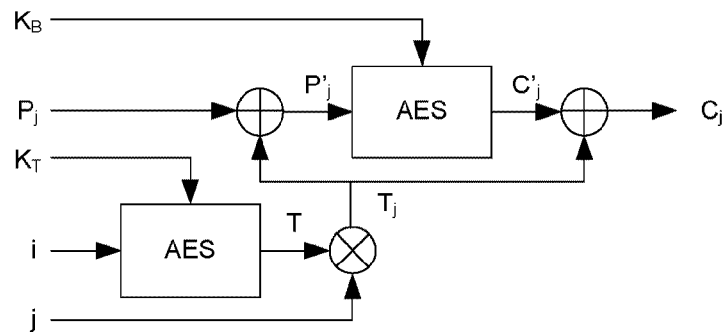
FIG. 14 depicts a dataflow diagram for the tweakable storage cipher (XTS) encryption mode.

As one example of an encryption mode that can be employed by the encryption mode wrapper circuit, FIG. 14 shows a dataflow diagram of the tweakable storage cipher (XTS) mode. XTS is designed to operate on independent fixed sized data units. A data unit number (logical storage block number) i is encrypted using a unique tweak key $K_T$ to generate a tweak value T. For each 128-bit data block in the data unit, $P_j$, the "tweak" value T is multiplied by the j-th power of a primitive element in the field $GF(2^{128})$, where j is the relative position of the 128-bit data block in the data unit. The resulting value $T_j$ is combined with the 128-bit data block $P_j$ using a bitwise exclusive-OR operation prior to input to the AES block cipher. The same "tweak" is combined with the 128-bit output of the block cipher $C'_j$ using a bitwise exclusive-OR operation to produce the ciphertext $C_j$. The multiplication and bitwise exclusive-OR operations can be performed by the encryption mode wrapper circuit on data destined for and returning from the block cipher circuit 103 to thereby achieve the desired XTS effect. Furthermore, the block cipher circuit 103 can optionally be utilized beforehand to generate the tweak value T.

Figure 2B:
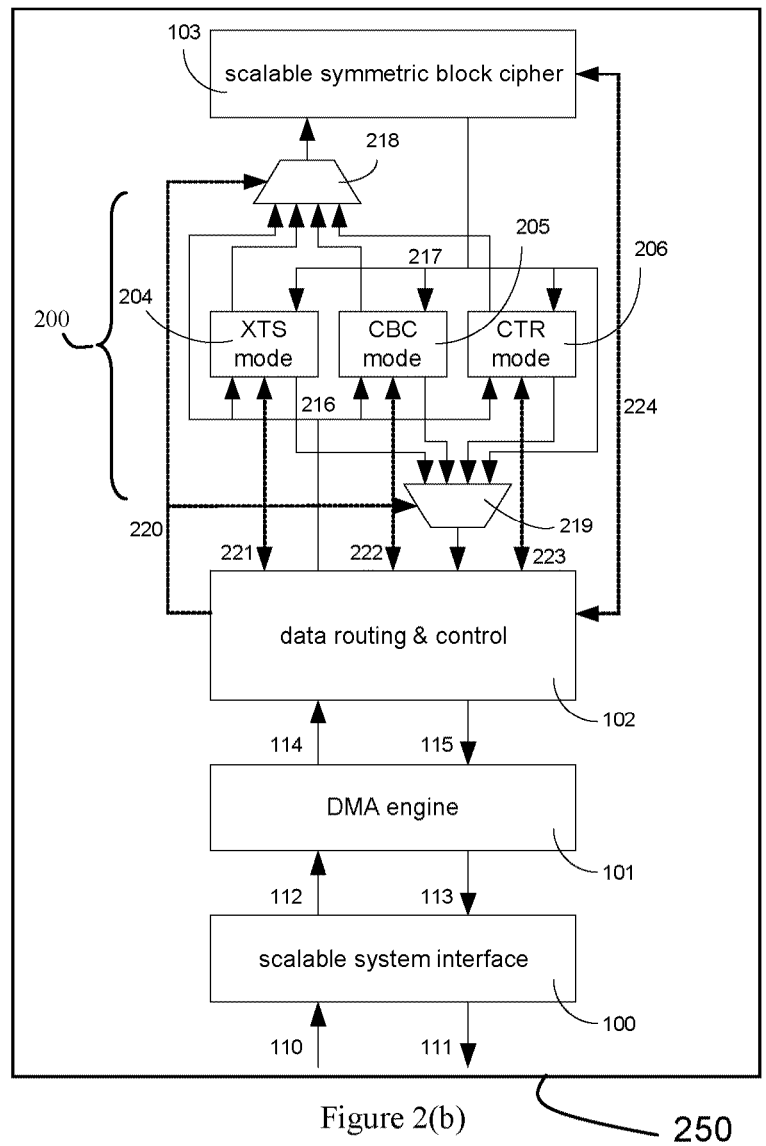
FIG. 2(b) depicts the integrated circuit of FIG. 2(a) with an exemplary encryption mode wrapper circuit shown in greater detail.

Shown in FIG. 2(b) is a block diagram of an IC 250 with an encryption mode wrapper circuit 200 that supports multiple encryption modes with a plurality of encryption mode circuits using a shared block cipher circuit 103. In the example of FIG. 2(b), the encryption mode circuits comprise an XTS mode circuit 204, a CBC mode circuit 205, and a CTR mode circuit 206. The selection of which encryption mode circuits will be included in the encryption mode wrapper circuit 200 can be made at design time. Also, it should be understood that more or fewer as well as different encryption mode circuits could be included in the encryption mode wrapper circuit 200.

In the example of FIG. 2(b), the data routing and control circuit 102 is extended to route data to and from the multiple encryption mode circuits. The data routing and control circuit 102 passes input data to encryption mode circuits 204, 205, and 206 across interface 216. This input interface may be monitored by all encryption mode circuits, as a given input data block will processed by one encryption mode circuit. Thus, the encryption mode wrapper circuit 200 can be configured such that all encryption mode circuits operate on all data, where the output of the appropriate encryption mode circuit can be passed as output based on a control signal delivered to a multiplexer by the data routing and control circuit. Another way to control which encryption mode circuit is effectively utilized is to pass an input data valid signal synchronous to the data to the appropriate encryption mode circuit, wherein the encryption mode circuits will only input data from interface 216 when their input data valid signal is asserted. Also note that interface 216 may deliver data directly to the block cipher in the event that an encryption mode circuit is not used for data inbound to the block cipher. Multiplexer 218 selects data for the scalable symmetric block cipher input among encryption mode output interfaces and interface 216 (no encryption mode) based on a control interface 220 from the data routing and control circuit 102. The same control interface 220 controls the selection of output ciphertext using multiplexer 219. The output of the scalable symmetric block cipher circuit is passed to the encryption mode circuits across interface 217. This output interface may be monitored by all encryption mode circuits, as a given output data block will be processed by one encryption mode circuit, with the same processing options for the different encryption mode circuits as explained above. Interface 217 also passes data directly to multiplexer 219 for the case that an encryption mode circuit is not used for data outbound from the block cipher. It should be noted that if the no encryption mode circuits are used to perform additional transformations on data going to and coming from the block cipher circuit, this effectively amounts to the ECB mode of encryption.

Figure 16:
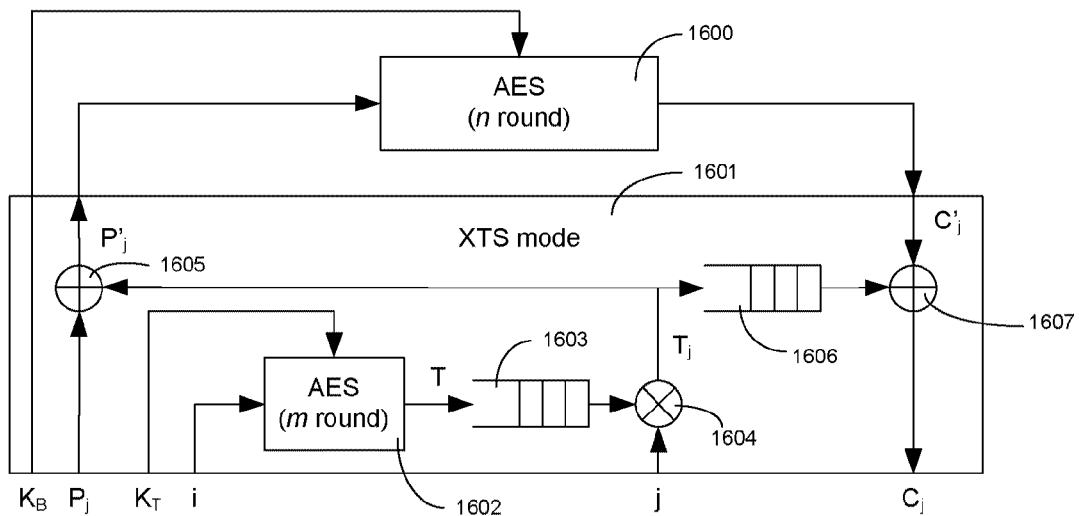
FIGS. 16 and 17 depict exemplary XTS mode circuits.

A circuit design for XTS mode circuit 203 in FIG. 2(b) is shown in FIG. 16 as circuit 1601. The scalable symmetric block cipher circuit 103 in FIG. 2(b) is shown as AES block cipher 1600 in FIG. 16. Block cipher 1600 contains a pipeline of n rounds, where n is chosen to meet the system throughput requirements as previously described. Circuit 1601 contains a scalable AES block cipher 1602 in order to compute tweak values in parallel to data block encryption and decryption. It should be noted that AES block cipher 1602 is not the same block cipher as block cipher circuit 103 which also shares the integrated circuit. The system passes the data unit number i for a pending data unit to the mode circuit. AES block cipher 1602 computes tweak value T using symmetric tweak key $K_T$. Tweak values T are stored in buffer 1603 until the first block of the data unit is input to the mode circuit. Block cipher 1602 is scaled to meet the data unit throughput requirements of the system. Given that data units contain multiple blocks, the data unit throughput requirement will be less than the data block throughput requirement. Cipher 1602 may therefore be scaled to contain fewer pipeline round circuits, consuming less area and power. By containing an independent block cipher for tweak computation and pre-processing tweak values, circuit 1601 maximizes the achievable throughput of the system by allowing a new data block to be input to scalable block cipher 1600 every clock cycle. For each data block, $P_j$, the tweak value T is multiplied 1604 by the j-th power of a primitive element in the field $GF(2^{128})$ to generate value $T_j$. (The tweak value T may be retrieved from the buffer and stored in a register until all data blocks of the data unit are processed.) The value $T_j$ is combined with data block $P_j$ using a bitwise exclusive-OR 1605 to produce value $P'_j$. Value $P'_j$ is passed to AES block cipher 1600 along with symmetric data key $K_B$. Value $T_j$ is stored in buffer 1606 until associated ciphertext block $C'_j$ is output from block cipher 1600. Value $T_j$ is then retrieved from buffer 1606 and combined with ciphertext block $C'_j$ using bitwise exclusive-OR 1607. The resulting ciphertext block $C_j$ is output from the circuit.

Figure 17:
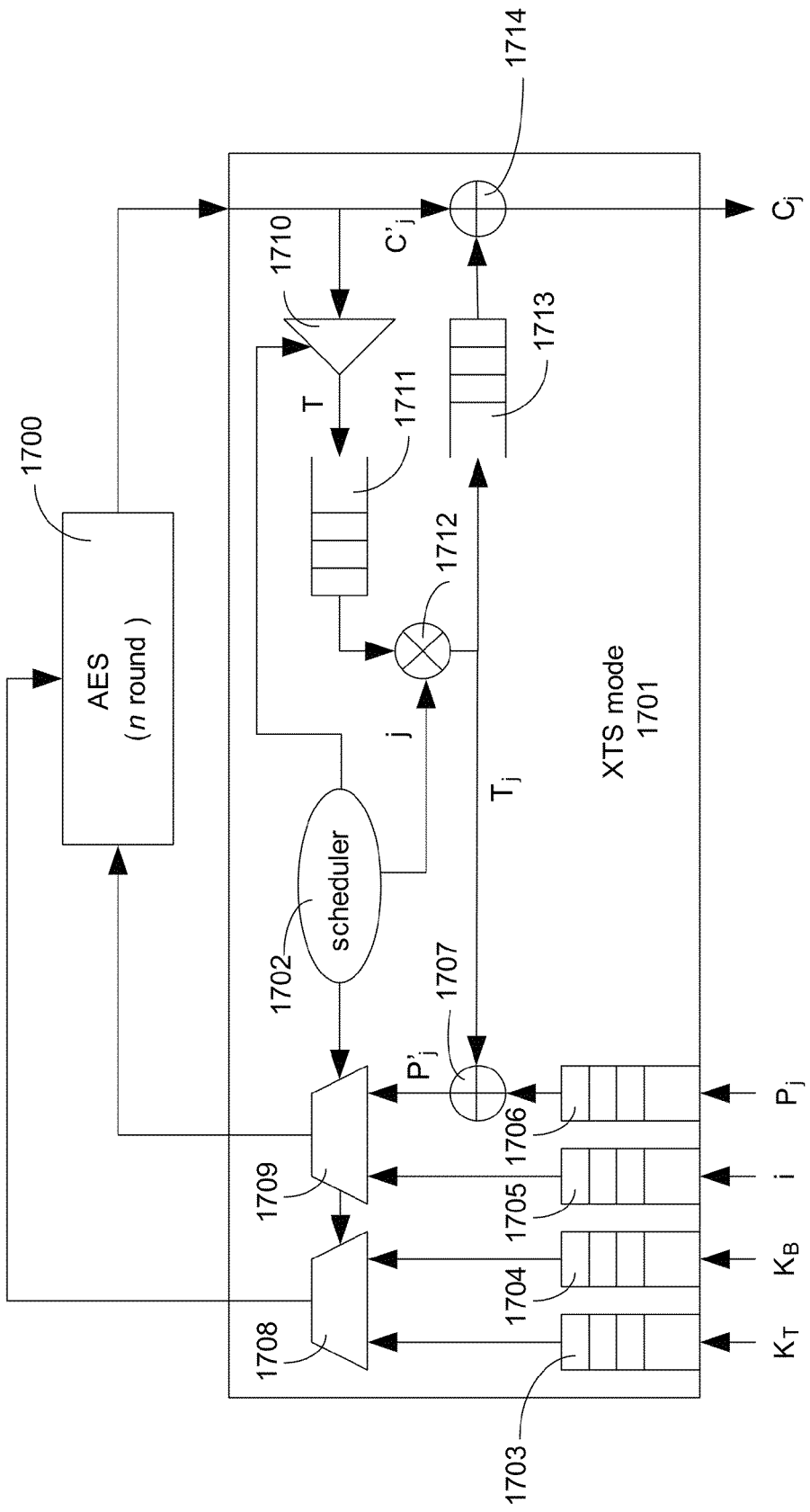

FIG. 17 shows an alternative circuit design 1701 for XTS mode circuit 203 in FIG. 2(b). Circuit 1701 does not include an independent block cipher for tweak computation, allowing for a smaller circuit with less power consumption. Circuit 1701 uses block cipher circuit 103 (shown as block cipher 1700 in FIG. 17) for computing tweak values. Thus, circuit 1710 schedules tweak value computations between data unit encryption computations using scheduler circuit 1702. Input buffers 1703-1706 store keys, data blocks, and data unit numbers while they await processing by the circuit. Scheduler 1702 controls the flow of keys and data to block cipher 1700 by multiplexing data blocks and data unit numbers using multiplexer 1709 and multiplexing data keys and tweak keys using multiplexer 1708. For a tweak computation, the next data unit number is retrieved from buffer 1705 and passed to block cipher 1700 via multiplexer 1709. The associated tweak key is retrieved from buffer 1703 and passed to block cipher 1700 via multiplexer 1708. When a tweak value T is output from block cipher 1700, it passes through gate 1710 and is stored in buffer 1711. For data encryption computations, tweak value T is retrieved from buffer 1711 and is multiplied 1712 by the j-th power of a primitive element in the field $GF(2^{128})$ to generate value $T_j$. Note that the value j may be produced by the scheduler as it is simply the data block number within the data unit. Alternatively, the j values may be queued along with data blocks. The value $T_j$ is combined with data block $P_j$ using exclusive-OR 1707 to produce value $P'_j$. Value $T_j$ is also stored in buffer 1713. Value $P'_j$ passes through multiplexer 1709 to block cipher 1700. Likewise, data key $K_B$ passes through multiplexer 1708 to block cipher 1700. When value $C'_j$ is output from block cipher 1700, value $T_j$ is retrieved from buffer 1713 and the values are combined using exclusive-OR 1714 to produce output ciphertext $C_j$.

Figure 18A:
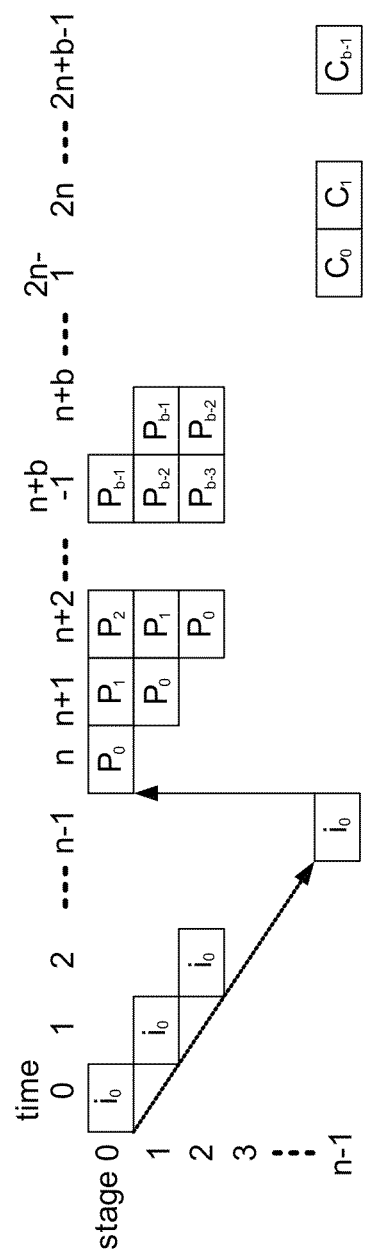
FIGS. 18(a) and (b) depict exemplary timing diagrams for the block cipher circuit to perform encryption, including computations for the XTS mode.

It should be noted that circuit 1701 may be pipelined such that once the tweak value T is computed, a new data block from the given data unit may be passed to the block cipher 1700 on each clock cycle. The goal of the scheduler circuit is to minimize the overhead of sharing the block cipher for tweak computation. A variety of scheduling techniques may be used. FIGS. 18(a) and (b) provide three examples where the pipelined block cipher requires n time steps to complete a block encryption operation, but a new block may be passed to the cipher at each time step. The examples also assume that the number of data blocks in a data unit b is less than the number of pipeline rounds in the block cipher n. FIG. 18(a) shows the amount of time required to completely process a single data unit. The tweak computation requires n time units. The first data block is passed to the cipher at time step n. The first ciphertext block emerges from the block cipher at time unit 2n. The last ciphertext block emerges from the block cipher at time unit 2n+b. If the scheduler waits until the last ciphertext block emerges from the block cipher to begin the next computation, then the circuit will process one data unit every 2n+b time units. This may be necessary in cases where the pipelined block cipher is unable to process blocks with different keys at the same time; i.e., The pipeline must be flushed prior to changing the key.

Note that the scalable symmetric block cipher circuit disclosed herein may also be pipelined in such a way as to allow a new key to be loaded with each input data block. With reference to FIG. 18(a), the data unit number of the next data block could be input to the system on cycle n+b. This would allow the system to process one data unit every n+b cycles.

Figure 18B:
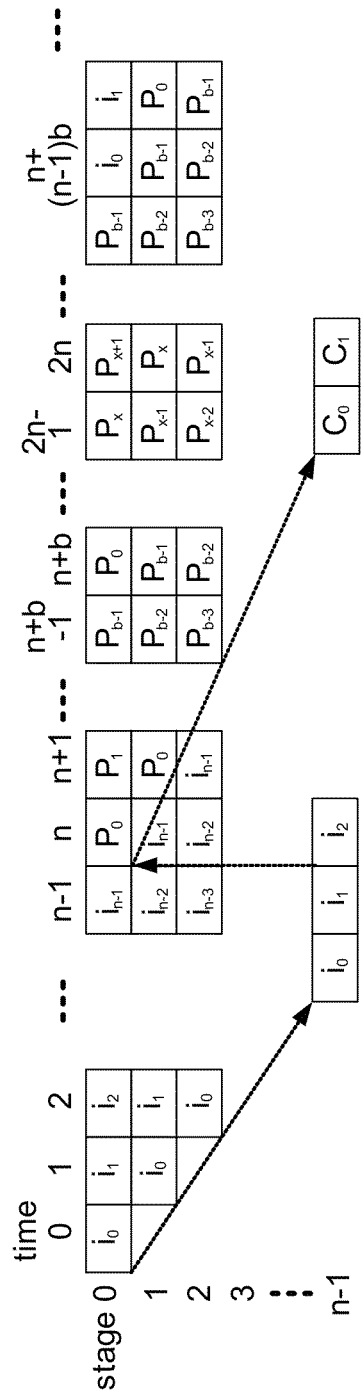

It should further be noted that only one pipeline round is active while the tweak value is computed. As shown in FIG. 18(b), the scheduler may use these cycles to pre-compute tweak values for pending data units. The scheduler may compute n tweak values without inducing any additional delay on the pending data units. When n data units are available for pre-computation, the circuit will process n data units every n+(n−1)b time units. For example, assume a time unit is 5 nanoseconds (200 MHz clock), a data unit is 512 bytes (contains 32 16-byte data blocks), and the block cipher pipeline is 40 stages deep. In this case the circuit would process 20 data units every 1288 cycles (6.44 microseconds), or 1.6 billion bytes per second.

Figure 2C:
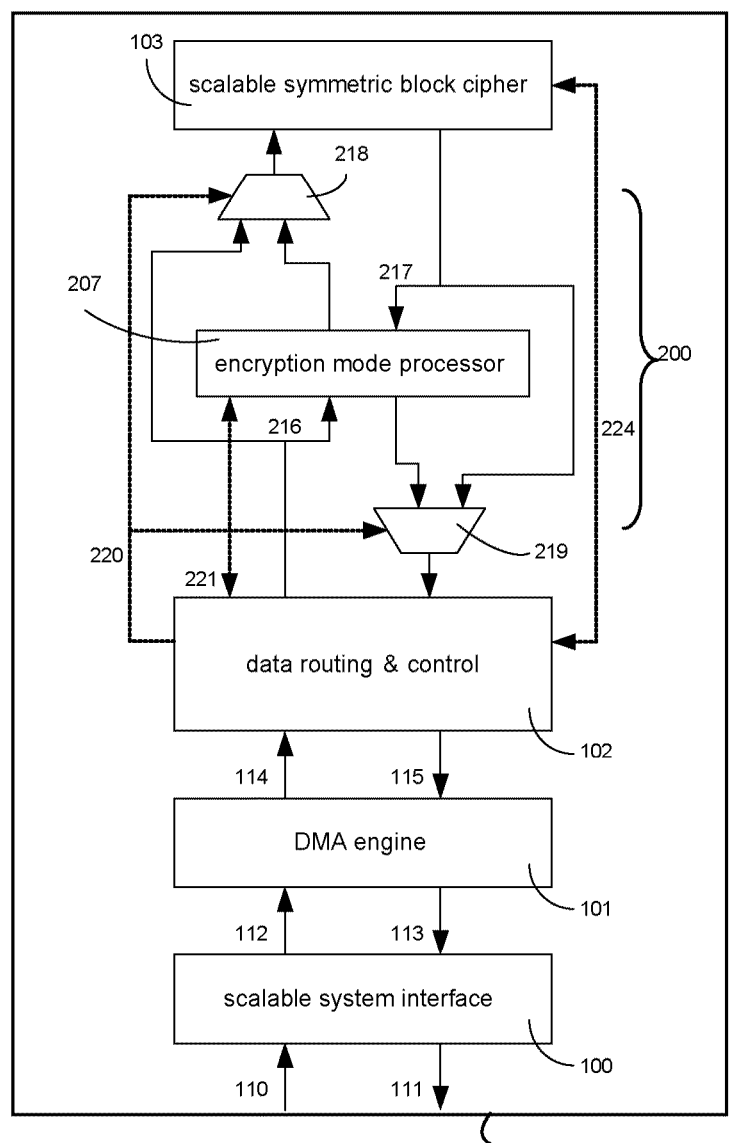
FIG. 2(c) depicts the integrated circuit of FIG. 2(a) wherein the encryption mode wrapper circuit comprises an encryption mode processor.

FIG. 2(c) depicts an IC 250 wherein the encryption mode wrapper circuit 200 includes an encryption mode processor (EMP) 207. The functionality of EMP 207 is preferably defined by firmware and provides support for a broad range of encryption modes (wherein the firmware defines additional transformations on the inputs and outputs of the block cipher circuit 103). The EMP 207 also allows new encryption modes to be added post manufacture. The computational complexity of the additional transformations defined by encryption modes is expected to be significantly less than that of the block cipher. This allows a simple EMP circuit 207 to match the performance of the block cipher 103. A wide variety of embedded processor designs are suitable for the EMP.

Figure 3:
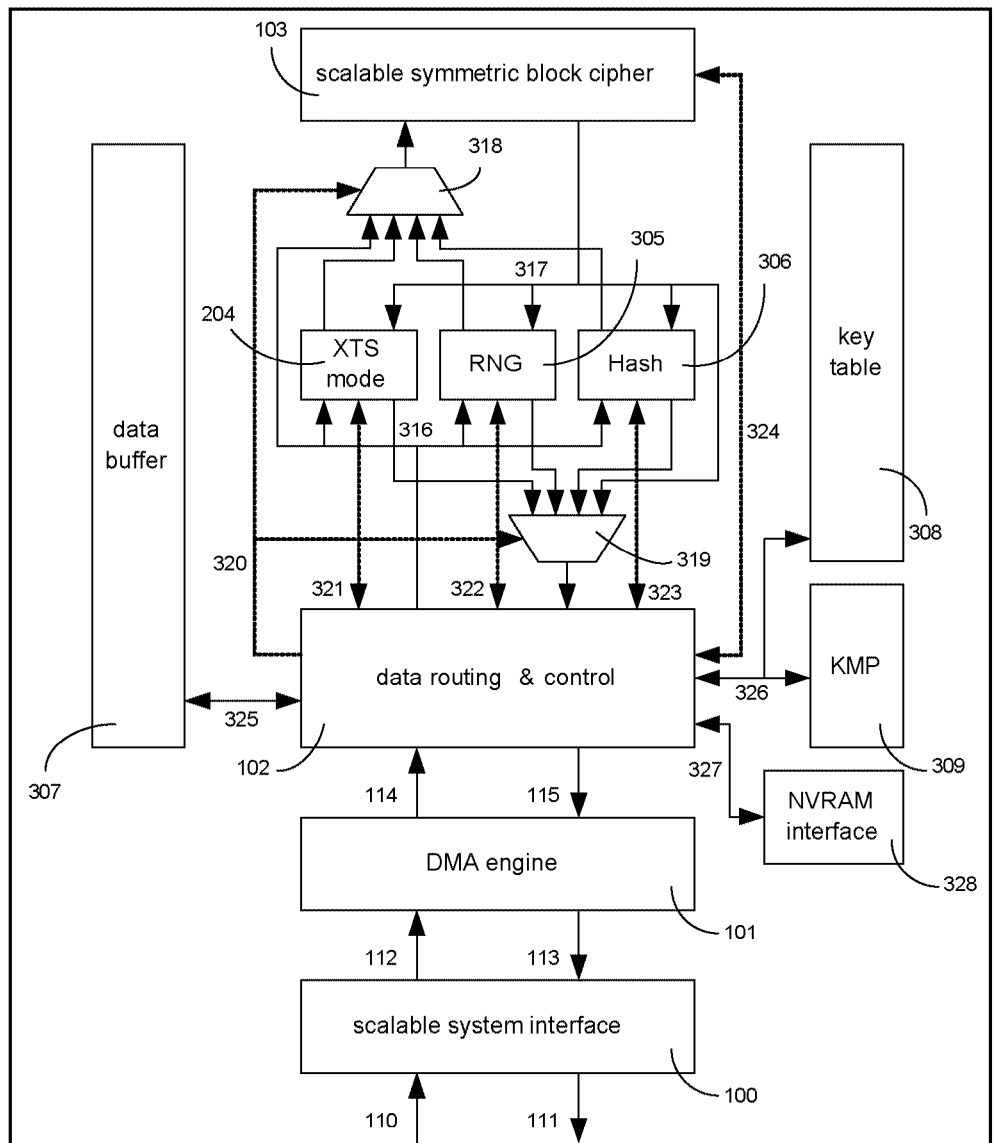
FIG. 3 depicts the integrated circuit of FIG. 2(a) enhanced to perform a plurality of key management functions.

VI. Key Management:

A strong block cipher, large key size, and clever encryption mode significantly reduces the probability of a successful attack on the ciphertext. Properly managing the creation, allocation, storage, and distribution of keys is of equal importance. If an attacker can easily gain access to a key or set of keys, encrypted data may be compromised without the need for sophisticated cryptanalysis. There are a wide variety of key management systems that typically adhere to a set of well-accepted guidelines. The guidelines include choosing random values for keys, regularly rotating the keys (encrypting data with a new key), protecting keys during storage and transmission, and guarding against component failures in the system. As shown in FIG. 3, the inventors disclose as an embodiment of the invention an IC 350 that includes several key management functions which offload other system components and increase the security of the system by only exposing keys inside of the IC 350.

The IC 350 builds upon the ICs shown in FIG. 1 and FIG. 2. The IC 350 includes one or more encryption mode circuits (e.g., XTS mode circuit 204) as well as one or more additional circuits that are configured to provide key management functionality (e.g., circuits 305 and 306). In a preferred embodiment, circuits 305 and 306 are hardware logic circuits. As examples, these hardware logic circuits can be deployed in reconfigurable logic or nonreconfigurable logic.

In addition to extending the set of circuits sharing the scalable block cipher circuit 103, the IC 350 adds a data buffer 307, key table 308, key management processor (KMP) 309, and non-volatile random access memory (NVRAM) interface 328. All of these components interface to the data routing and control circuit 102. While the data buffer 307 and key table 308 may take the form of non-volatile memory, preferably volatile memory is used for buffer 307 and/or table 308 to enhance security. The data buffer 307 allows keys to be rotated without exposing plaintext outside of the IC 350. The key table 308 allows a large number of keys and their associated meta-data to be stored and quickly accessed by other components in the IC 350. The NVRAM interface 328 allows keys to be stored in a secure non-volatile device accessible only by the IC 350. The KMP 309 is responsible for loading keys into the key table and reading keys out of the key table for storage or transfer.

Figure 4A:
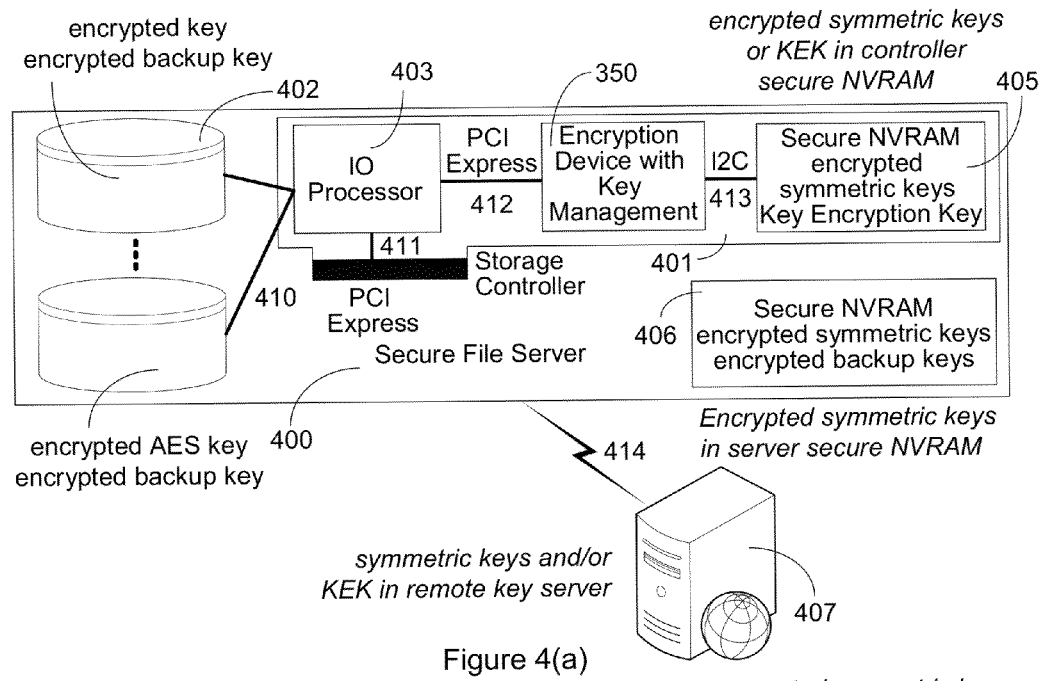
FIGS. 4(a) and (b) depict exemplary key storage environments in which the integrated circuit such as the one shown in FIG. 3 can be utilized.
Figure 4B:
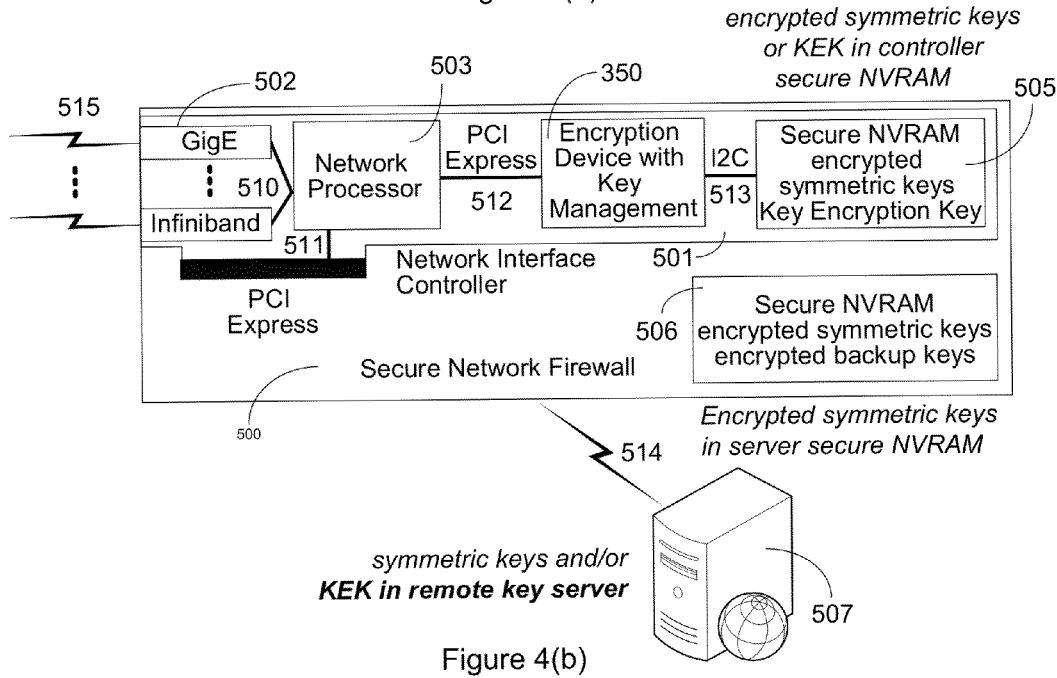

The KMP 309 may directly load keys generated by circuits on the IC 350 into the key table 308, ensuring that keys are never exposed outside of the IC 350. The KMP 309 may also load keys from the NVRAM interface 328. The KMP 309 may also implement a key transfer protocol with a remote key server to load keys from the remote key server into the key table 308 or read keys from the key table 308 and encrypt them prior to transfer to a remote key server for storage. FIG. 4(a) and FIG. 4(b) show examples of key storage options.

In most data security applications, key load and key transfer are rare tasks relative to encryption and decryption of data blocks. In this case the KMP 309 may be implemented as an embedded instruction processor whose function is defined by firmware. Example functions include asymmetric key cryptography (AKC), also known as public key cryptography. In public key cryptography, a pair of keys (private and public) are used to encrypt and decrypt data. As implied by the names, the private key is kept secret and the public key is made freely available. Data encrypted with the private key may be decrypted with the public key. It is prohibitively difficult to reproduce a given encrypted data block without the private key. Used in this way, AKC provides an authentication mechanism for data receivers to verify that a message was produced by the sender. Data encrypted with the public key may only be decrypted with the private key. Used in this way, AKC provides a secure one-way communication from public key holders to the private key holder. Key exchange and shared key establishment protocols also utilize public key cryptography. The KMP 309 may be configured to perform any of these functions in support of a specific key management architecture.

Figure 5:
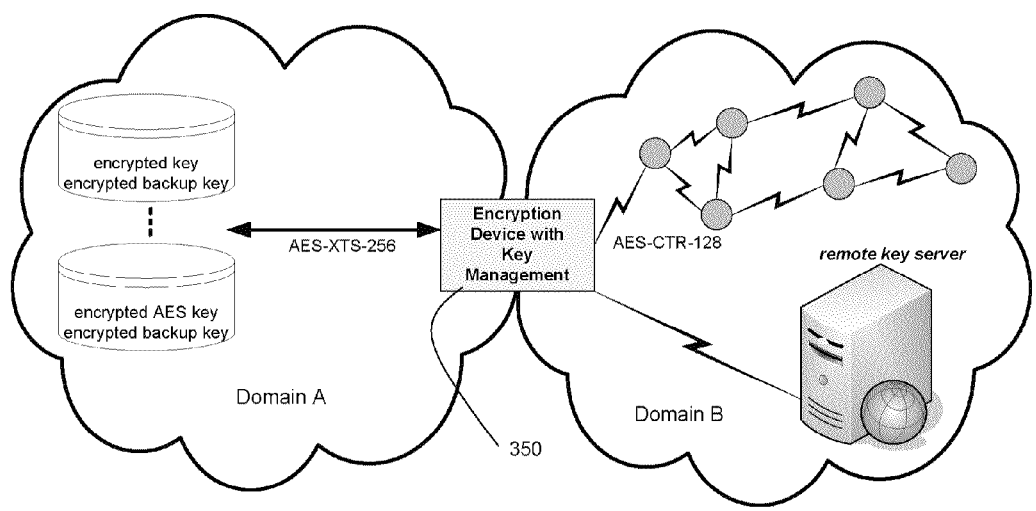
FIG. 5 depicts an exemplary environment in which an integrated circuit such as the one shown in FIG. 3 can function as a cryptographic domain bridge.

The additional key management features provided in the IC 350 enable the IC 350 to be easily integrated in a broad spectrum of applications and key management systems. The modularity and flexibility of the key management functions allow the key management architecture to be changed over time to address emerging security concerns. The additional key management features also allow the device to act as a cryptographic domain bridge in a federated security architecture. As shown in FIG. 5, a federated security architecture allows multiple security domains to be defined where each domain may define its own encryption and key management policies. For example, with reference to FIG. 5, data in domain A is encrypted with AES-XTS and the 256-bit symmetric keys are encrypted and stored on media (e.g., RAIDs). Data in domain B is encrypted using AES-CTR and the 128-bit keys are stored on a centralized key server. The IC 350 functions as a cryptographic domain bridge for data flowing across the domain boundary by decrypting data using the algorithm and key specified by the source domain then encrypting data using the algorithm and key specified by the destination domain.

An example of a key management function that can be provided by IC 350 is key rotation. With key rotation, the encryption keys used to secure the data are periodically changed. Data buffer 307 allows the IC 350 to support key rotation without exposing plaintext data outside of the integrated circuit. Data is first decrypted using the existing key. The data routing and control circuit 102 routes the decrypted data blocks to data buffer 307 across interface 325. Data buffer 307 is not accessible from outside the integrated circuit and its contents are erased when power is removed. Once the decryption operation is complete, the plaintext data blocks are routed back through the encryption circuits, encrypted using a new key, and transferred out of the IC 350. Note that in addition to changing the key used to secure the data, the encryption mode may also be changed. The data routing and control circuit 102 manages the process of passing the correct key to the scalable symmetric block cipher circuit 103 via interface 324, selecting the appropriate encryption mode via control interfaces 320-321, and routing data to and from the data buffer 307 via interface 325, the cryptography circuits via interfaces via interfaces 316-317, and the DMA engine circuit 101 via interfaces 314-315.

Another key management function that can be provided by IC 350 is key generation. The IC 350 can provide support for secure key generation using the RNG circuit 305. In a preferred embodiment, a key generation command from the key management application contains a seed value and a destination index that specifies the location in the key table 308 to store the generated key. The command is received by the system interface circuit 100 and passed to the data routing and control circuit 102. The data routing and control circuit 102 passes the specified seed to the RNG circuit 305 via interface 316 and directs the RNG circuit to produce a key of a specified value via control interface 322. The key is returned to the data routing and control circuit which stores the key in the specified index in the key table 308 via interface 326.

There are a wide variety of techniques for generating pseudo-random sequences given a seed value. Several techniques do not require a block cipher, such as a linear feedback shift register (LFSR) with a prime polynomial feedback function. A preferred embodiment for the RNG circuit 305 utilizes the seed value as a key for the symmetric block cipher and the output of a free-running counter as the data input. Arbitrarily long random values may be constructed by concatenating the output ciphertext.

The IC 350 also contains a cryptographic hash circuit 306 that may be used for key authentication and key generation. Key authentication involves ensuring that a received key is from a known source. The input to the hash circuit 306 is an arbitrary length "message". The output of the hash circuit is a fixed-length digest. Thus, given the arbitrary length input text, a cryptographic hash function circuit 306 produces a fixed length digest, wherein the hash function has the properties that it is prohibitively difficult to reconstruct the original input text given the digest, and it is prohibitively difficult to choose two input texts that produce the same digest. These properties are useful for key generation from input pass phrases, data validation, and data authentication using digital signatures.

Figure 15:
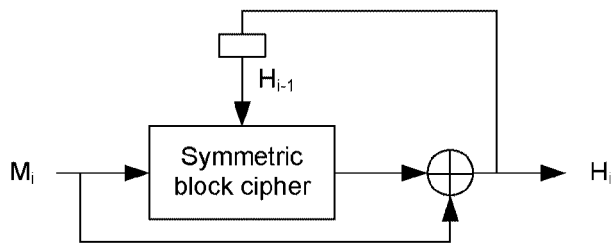
FIG. 15 depicts an exemplary cryptographic hash circuit that utilizes a symmetric block cipher circuit.

In a preferred embodiment the symmetric block cipher circuit 103 is used to compute the cryptographic hash. A diagram of a cryptographic hash circuit 306 that utilizes a symmetric block cipher circuit is shown in FIG. 15. It should be noted that this block cipher circuit is the integrated circuit's block cipher circuit 103. The message is partitioned into blocks and input to the block cipher. The output digest is the concatenation of the final j hash values produced by the circuit, where j is at least one and at most the number of blocks in the input message. Hash value i, $H_i$, is the result of the bitwise exclusive-OR of block i of the message, $M_i$, and the ciphertext produced by encrypting $M_i$ using the previous hash value $H_{i-1}$ as the key. Other block cipher-based cryptographic hash circuits are feasible; FIG. 15 is exemplary.

The IC 350 also contains a key table memory 308 that provides storage for a large number of encryption keys and associated meta-data. Examples of key meta-data include key size and timestamp. Key size specifies the size of the key and is used to properly configure the scalable symmetric block cipher circuit 103. Key timestamp specifies the time of key creation and can be used to manage key lifecycle. The key timestamp may be included with the key when it is transferred into the IC 350, or written by the IC 350 when the IC 350 generates the key. Each storage location in the key table is a key index. Stored at each key index may be an encryption key, a pre-expanded decryption key, and associated key meta-data. System commands may specify the key to use for a particular cryptography operation by specifying the key index instead of explicitly passing the key. The inclusion of a key table 308 prevents the need to transfer keys prior to every operation, reducing the latency of the operation by providing immediate access to the required key.

The meta-data fields in a key table entry may also be extended to include configuration data such as encryption mode parameters. For example, the meta-data fields may include encryption mode, data unit size, and an additional mode key. Associating meta-data with a key simplifies the system control semantics, allowing the system to specify the key index and a pointer to the data. The meta-data is fetched by the DMA engine circuit 101 and the key index is used to retrieve all of the configuration parameters that dictate the processing of the data.

Note that while the IC 350 shows only one encryption mode circuit (XTS mode circuit 204), the IC 350 may be extended to include additional encryption mode circuits or an encryption mode processor as shown in FIGS. 2(b) and (c). Additional cryptography functions that utilize a symmetric block cipher other than the RNG circuit 305 and hash circuit 306 may also be added.

The IC 350 also contains a key management processor (KMP) 309. The KMP 309 may be a fixed circuit, but in a preferred embodiment the KMP 309 is an embedded instruction processor whose behavior is defined by firmware. Examples of suitable embedded instruction processors include ARM and LEON processors. The KMP 309 allows keys to be transferred into and out of the IC 350 using a wide variety of key transfer protocols. The advantage of a firmware programmable processor is the ability to modify the key management functions supported by the IC 350, post-manufacture. In addition to supporting secure key transfer into and out of the IC 350, the KMP 309 can also be configured to perform key authentication and key encryption/decryption (key wrapping/unwrapping). Commands and data are transferred to and from the KMP via interface 326 that links the data routing and control circuit 102 and the key table 308. The KMP manages the reading and writing of keys to/from the key table from external sources. The KMP ensures that keys transferred out of the IC 350 are encrypted using a Key Encryption Key (KEK) or shared session key established through a suitable key exchange protocol. Examples of public key cryptography techniques that may be implemented in the KMP for establishing session keys and transferring keys into and out of the IC 350 include RSA and elliptic curve cryptography (ECC).

The IC 350 also includes an interface circuit 328 to a non-volatile random access memory (NVRAM) device. An NVRAM device may be included in the IC 350 or included in the system as an additional component with a secure, point-to-point interface with the IC 350. The NVRAM device provides storage for keys, KEKs, and firmware for embedded processors in the IC 350. In a preferred embodiment, the firmware for the KMP and EMP, if present, are read out of the NVRAM device through the NVRAM interface circuit 328 when power is applied to the IC 350. Simple boot programs in the embedded processors issue read commands that are routed through the data routing and control circuit 102, across interface 327, to NVRAM interface circuit 328. Read responses are routed back to the embedded processors by the data routing and control circuit. The KMP may issue key read and write commands to the NVRAM interface in cases were keys or KEKs are stored in the NVRAM.

FIG. 4(a) depicts an exemplary system that includes the integrated circuit 350 in the storage controller 401 of a secure file server 400. The secure file server stores data on one or more arrays of high-speed disks 402. The storage controller 401 includes an Input/Output (10) Processor 403 that connects to the disk array via interconnect 410 and links to the rest of the file server via system interface 411. The encryption and key management IC 350 enables the storage controller 401 to encrypt all data written to the disk array and decrypt all data read from the disk array without reducing the data throughput. Data is transferred between the IC 350 and IO Processor via interface 412.

FIG. 4(*a*) also highlights a variety of options for symmetric key and KEK storage. The location of keys within the system is dictated by the key management architecture. The storage controller 401 may include a secure NVRAM device 405 for symmetric key, KEK, and firmware storage. The secure file server may also include a secure NVRAM device 406 for key and KEK storage. The secure file server may also include a network interface 414 to a remote key server 407 that securely stores symmetric keys and KEKs. Key transfers to and from the remote key server are executed by the key management processor (KMP) in the IC 350.

FIG. 4(*b*) depicts an exemplary system that includes the IC 350 in the network interface controller 501 of a secure network firewall 500. In this system, the IC 350 interfaces with a network processor 503 that also includes interfaces to external communication links 515 and the firewall system 511. Like the secure file server example in FIG. 4(*a*), the example in FIG. 4(*b*) shows a variety of key and KEK storage options, including a remote key server 507.

FIGS. 6-11 illustrate a plurality of different exemplary key management functions that the IC 350 can perform. These key management functions provide the IC 350 with the ability to securely load keys into the IC 350 and transfer keys out of the IC 350 using the flexible KMP. It should be noted however, that the IC 350 can be configured to perform additional and/or different key management functions if desired by a practitioner of this embodiment of the invention.

Figure 6:
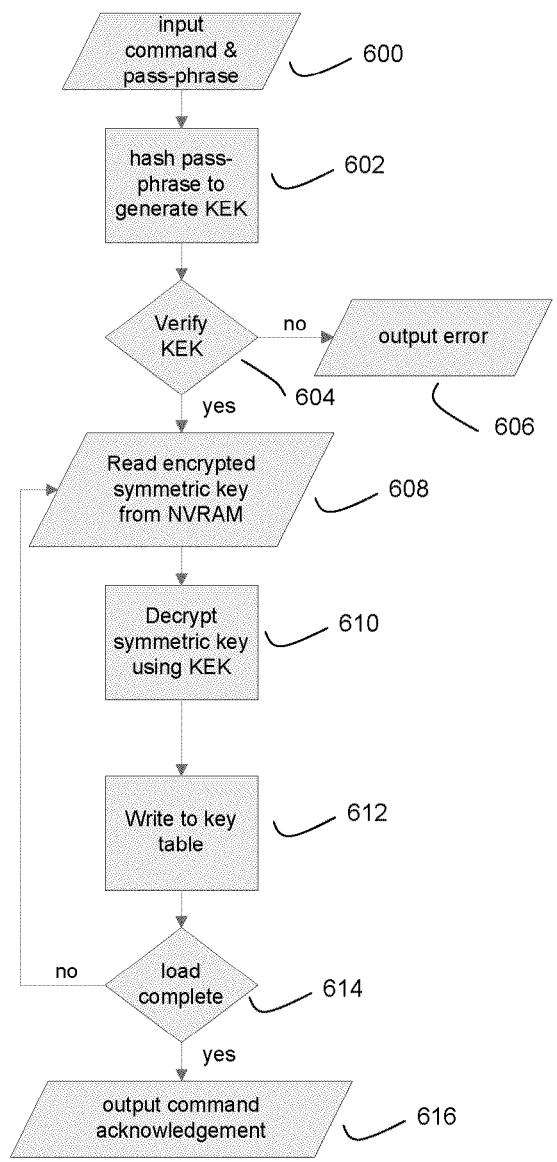
FIGS. 6-11 depict exemplary process flows for key management functions that can be performed by the integrated circuit of FIG. 3.

FIG. 6 illustrate a process flow for loading symmetric keys wrapped with a KEK, wherein the KEK is derived from a user-supplied pass-phrase, and wherein the KEK-wrapped symmetric keys are stored in an NVRAM device. At step 600, a key load command containing a user-supplied pass-phrase is passed to the IC 350. The pass-phrase is passed to the cryptographic hash circuit 306 for generation of the digest therefrom (step 602). The resulting digest is the key encryption key (KEK) that is loaded into the symmetric block cipher circuit 103. First, however, the KEK is verified at step 604. There are a variety of ways to ensure that the KEK generated from the pass-phrase is the same KEK used to wrap the keys that are on the NVRAM device. Of course, the appropriate pass-phrase must be used for the KEK to be successfully generated. Furthermore, this KEK may be used to encrypt a known value (which can be referred to as a "cookie"). This encrypted known value can be stored on the NVRAM with the wrapped keys. The verify step 604 would then decrypt the known value and check for its correctness. If the decrypted value is not equal to the known value, the IC will respond with an error command (step 606) and not decrypt the wrapped keys.

Following successful verification, an encrypted key is read from the NVRAM device and passed to the symmetric block cipher circuit at step 608. At step 610, the block cipher circuit 103 decrypts the symmetric key using the KEK. The KMP then stores the decrypted symmetric key in the key table location specified by the command (step 612). If the command specified multiple keys to be loaded, the process repeats (step 614 to step 608), but the KEK need not be regenerated. Once all keys are read, decrypted, and loaded into the key table, the KMP generates a command acknowledgement that is returned to the system (step 616).

Figure 7:
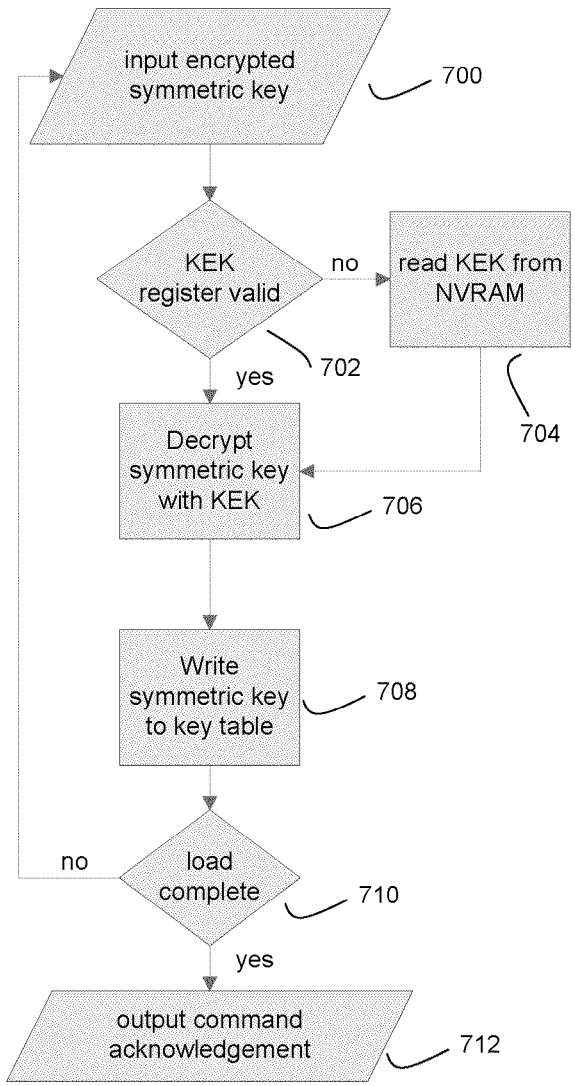

FIG. 7 illustrates a process flow for loading symmetric keys wrapped with a KEK, wherein the KEK is stored in a secure NVRAM device accessible only to the IC 350. A key load command containing one or more KEK-wrapped symmetric keys is passed to the IC 350 (step 700). A register may be used to store the current KEK. At step 702, if that register value is not valid, then the KEK is read from the NVRAM device (step 704). The KEK is loaded into the symmetric block cipher circuit 103 and KEK register. The encrypted symmetric key is also passed to the symmetric block cipher. At step 706, the block cipher circuit 103 decrypts the KEK-wrapped symmetric key using the KEK. The KMP then stores the decrypted symmetric key in the key table location specified by the command (step 708). If the command specified multiple keys to be loaded, the process repeats (step 710 to step 700), but the KEK need not be reloaded. Once all keys are decrypted and loaded into the key table, the KMP generates a command acknowledgement that is returned to the system (step 712).

Figure 8:
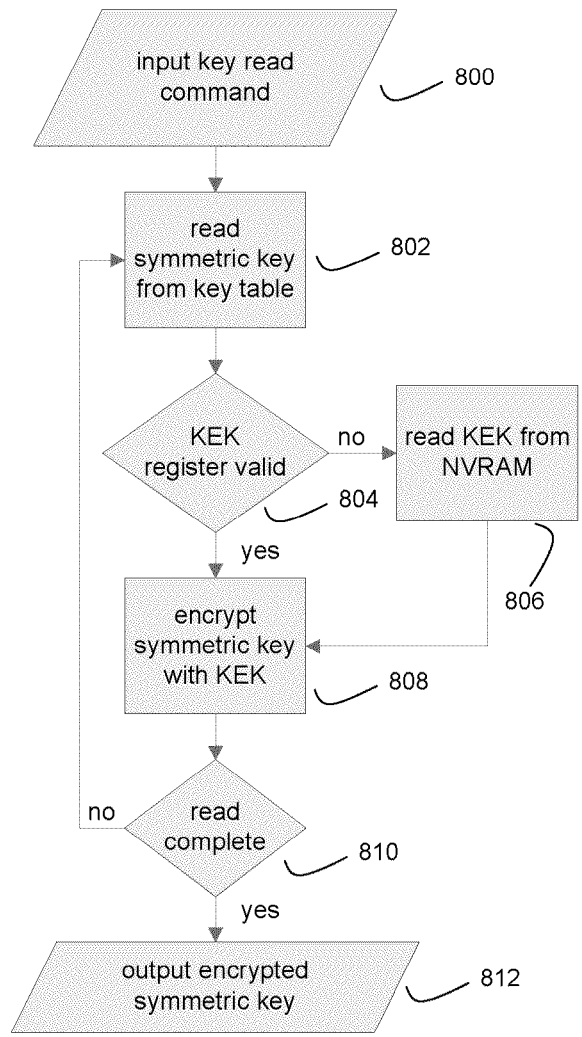

FIG. 8 illustrates a process flow for transferring symmetric keys out of the key table where each key is encrypted prior to transfer using a KEK that is stored in the NVRAM device. A key read command specifying one or more table indexes to read is passed to the IC 350 at step 800. The KMP reads the first symmetric key from the key table at the index specified by the command (step 802). A register may be used to store the current KEK. If step 804 results in a finding that the register value is not valid, then the KEK is read from the NVRAM (step 806). Once the register value is valid, the KEK is loaded into the symmetric block cipher circuit 103, and the block cipher circuit 103 encrypts the symmetric key using the KEK (step 808). If the command specified multiple keys to be read, the process repeats (step 810 to step 802), but the KEK need not be reloaded. Once the keys are encrypted, they are transferred out of the IC 350 as a command response (step 812).

Figure 9:
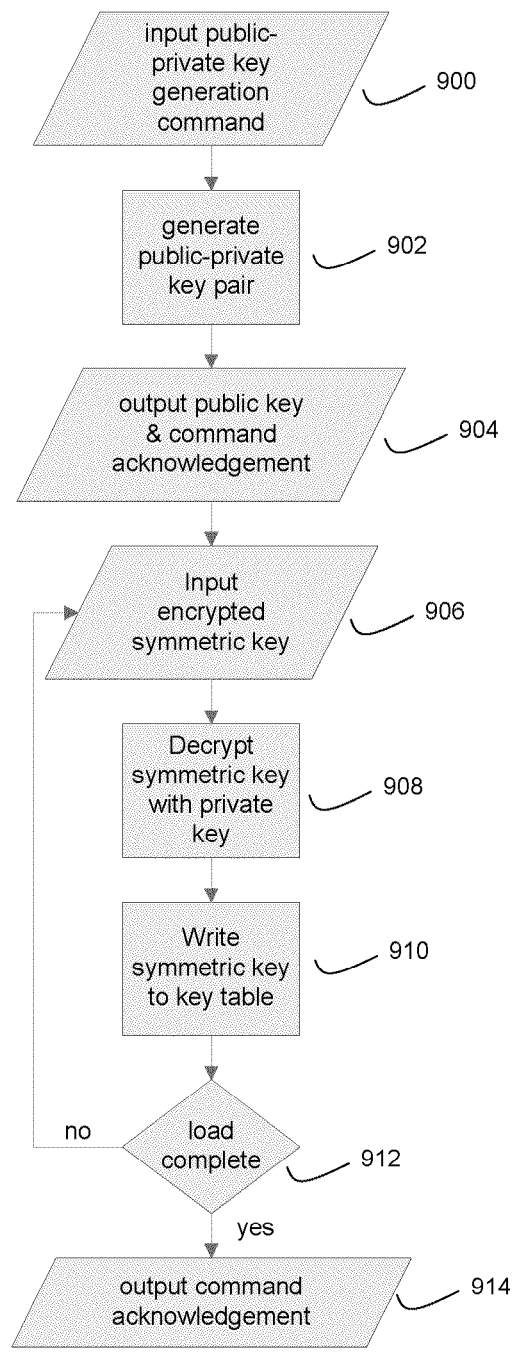

FIG. 9 illustrates a process flow for loading symmetric keys using public key cryptography, where the symmetric keys are encrypted with the advertised public key and decrypted with the private key. At step 900, a public-private key generation command is passed to the IC 350, instructing it to generate an ephemeral key pair for a secure key transfer session. The KMP then generates a public-private key pair (step 902) and returns the public key with the command response (step 904). A register may be used to store the private key. A subsequent key load command containing one or more encrypted symmetric keys is passed to the IC 350 (step 906). The KMP decrypts the symmetric key using the private key of the ephemeral pair (step 908). The KMP then loads the symmetric key into the key table at the specified index (step 910). If the command specified multiple keys to be loaded, the process repeats (step 912 to step 906). Once all keys are decrypted and loaded into the key table, the KMP generates a command acknowledgement that is returned to the system (step 914).

Figure 10:
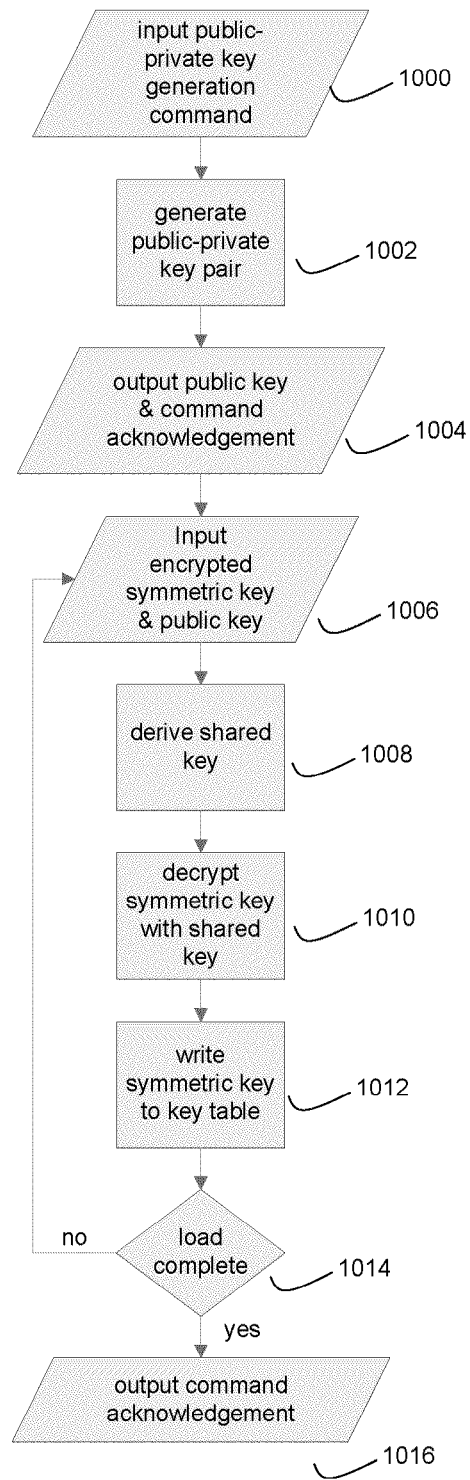

FIG. 10 illustrates a process flow for loading symmetric keys using public key cryptography where the symmetric keys are encrypted with a shared key, wherein the shared key is derived from the advertised public keys. At step 1000, a public-private key generation command is passed to the IC 350, instructing it to generate an ephemeral key pair for a secure key transfer session. The KMP then generates a public-private key pair (step 1002) and returns the public key and shared key parameters with the command response (step 1004). A register may be used to store the private key and shared key parameters. A subsequent key load command containing one or more encrypted symmetric keys and the public key of the key sender is passed to the IC 350 (step 1006). The KMP derives the shared key using its key pair, the sender's public key, and the shared key parameters (step 1008) using a protocol such as ECC. Once derived, the KMP uses the shared key to decrypt the symmetric key (step 1010). The KMP then loads the symmetric key into the key table at the specified index (step 1012). If the command specified multiple keys to be loaded, the process repeats (step 1014 to step 1006), but the shared key need not to be derived again. Once all keys are decrypted and loaded into the key table, the KMP generates a command acknowledgement that is returned to the system (step 1016).

Figure 11:
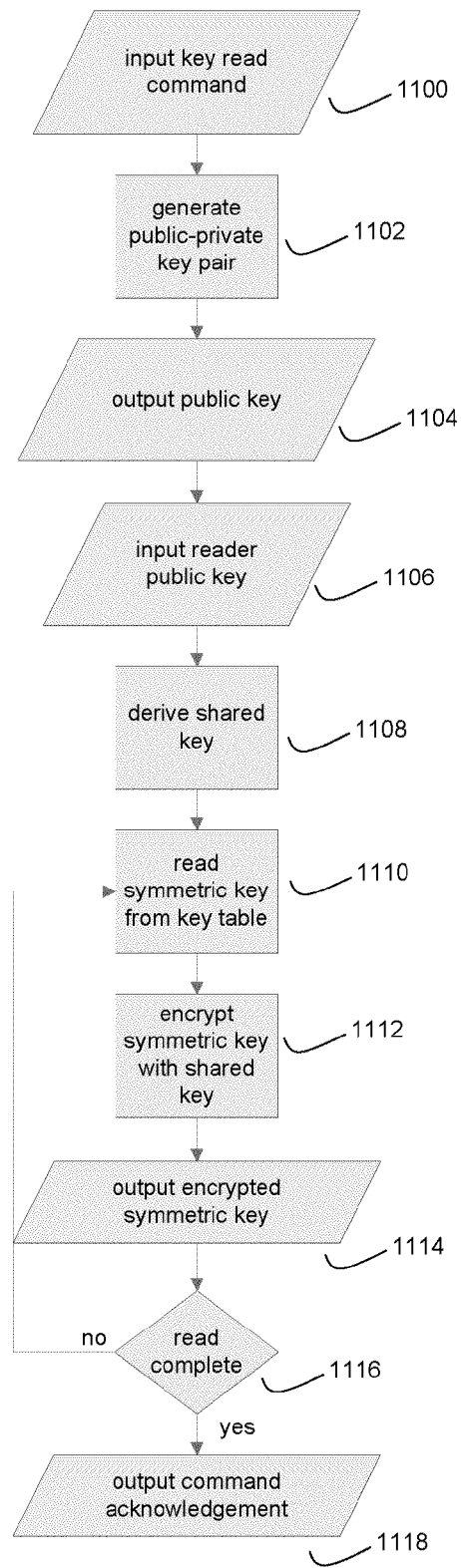

FIG. 11 illustrates a process flow for reading symmetric keys using public key cryptography where the symmetric keys are encrypted with a shared key, wherein the shared key is derived from advertised public keys. At step 1100, a public-private key generation command is passed to the IC 350, instructing it to generate an ephemeral key pair for a secure key transfer session. The KMP generates a public-private key pair (step 1102) and returns the public key and shared key parameters with the command response (step 1104). A register may be used to store the private key. A subsequent command containing the public key of the reading application (i.e., the destination of the encrypted keys), the shared key parameters, and the key table indexes to be read is input to the IC 350 at step 1106. Using the private and public keys, the sender's public key, and the shared key parameters, the KMP derives the shared key at step 1108 using a protocol such as ECC. At step 1110, the first symmetric key is read from the key table at the specified index. The KMP encrypts the key with the shared key (step 1112) and outputs the encrypted symmetric key (step 1114). If the command specified multiple keys to be read, the process repeats (step 1116 to step 1110), but the shared key need to be derived again. Once all keys are encrypted and transferred out of the IC 350, the KMP generates a command acknowledgement that is returned to the system (step 1118).

It should be noted that the preceding processes and associated flow diagrams for FIGS. 6-11 are exemplary and by no means exhaustive. The flexible key management capabilities of IC 350 provide for a wide variety of other key management functions to also be employed.

Figure 24:
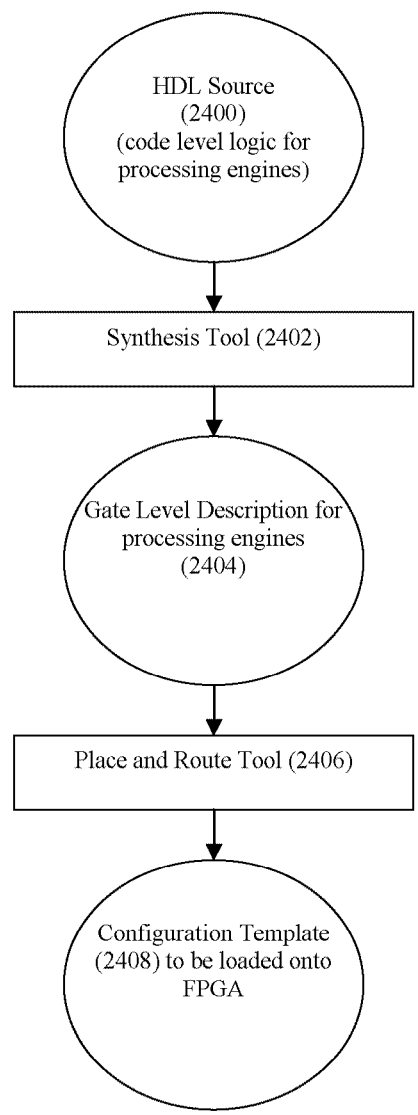

VII. IC Design:

To generate a firmware template for loading onto an FPGA, wherein the firmware template embodies one or more of the hardware logic circuits described herein for any of ICs 150/250/350, the process flow of FIG. 24 can be performed. First, code level logic 2400 for the desired hardware logic circuits that defines both the operation of the circuits and their interaction with each other is created. This code, at the register level, is preferably Hardware Description Language (HDL) source code, and it can be created using standard programming languages and techniques. As examples of an HDL, VHDL or Verilog can be used. Thus, with respect to the embodiment of FIG. 3, this HDL code 2400 could comprise a data structure corresponding to a combination of various IC circuits shown in FIG. 3.

Thereafter, at step 2402, a synthesis tool is used to convert the HDL source code 2400 into a data structure that is a gate level logic description 2404 for the hardware logic circuits. A preferred synthesis tool is the well-known Synplicity Pro software provided by Synplicity, and a preferred gate level description 2404 is an EDIF netlist. However, it should be noted that other synthesis tools and gate level descriptions can be used. Next, at step 2406, a place and route tool is used to convert the EDIF netlist 2404 into a data structure that comprises the template 2408 that is to be loaded into the FPGA. A preferred place and route tool is the Xilinx ISE toolset that includes functionality for mapping, timing analysis, and output generation, as is known in the art. However, other place and route tools can be used in the practice of the present invention. The template 2408 is a bit configuration file that can be loaded into an FPGA through the FPGA's Joint Test Access Group (JTAG) multipin interface, as is known in the art. Other techniques for loading the template into the FPGA include loading from an attached non-volatile memory device, e.g., Electrically Erasable Programmable Read Only Memory (EEPROM), and loading the template from an attached reconfigurable logic device (e.g., another FPGA).

However, it should also be noted that the process of generating template 2408 can begin at a higher level, as shown in FIGS. 25(*a*) and (*b*). Thus, a user can create a data structure that comprises high level source code 2500. An example of a high level source code language is SystemC, an IEEE standard language; however, it should be noted that other high level languages could be used. Thus, with respect to the embodiment of FIG. 3, this high level source code 2500 could comprise a data structure corresponding to a combination of various IC circuits shown in FIG. 3.

At step 2502, a compiler such as a SystemC compiler can be used to convert the high level source code 2500 to the HDL code 2400. Thereafter, the process flow can proceed as described in FIG. 24 to generate the desired template 2408. It should be noted that the compiler and synthesizer can operate together such that the HDL code 2400 is transparent to a user (e.g., the HDL source code 2400 resides in a temporary file used by the toolset for the synthesizing step following the compiling step). Further still, as shown in FIG. 25(*b*), the high level code 2502 may also be directly synthesized at step 2506 to the gate level code 2404.

As would be readily understood by those having ordinary skill in the art, the process flows of FIGS. 24 and 25(*a*)-(*b*) can not only be used to generate configuration templates for FPGAs, but also for other hardware logic devices, such as other reconfigurable logic devices and ASICs.

While the present invention has been described above in relation to its preferred embodiments, various modifications may be made thereto that still fall within the invention's scope. Such modifications to the invention will be recognizable upon review of the teachings herein. Accordingly, the full scope of the present invention is to be defined solely by the appended claims and their legal equivalents.

What is claimed is:

1. An apparatus comprising:
   a key-based block cipher circuit, the block cipher circuit configured to encrypt a data block based on a key;
   wherein the block cipher circuit comprises a plurality of round circuits that are arranged in a pipelined sequence of operatively adjacent round circuits, the round circuits for simultaneously performing rounds of encryption; and
   wherein the block cipher circuit is run-time scalable with respect to how many of the round circuits are active and how many passes through the round circuits are needed to encrypt a data block, and wherein the run-time scalability is achieved via a member of the group consisting of (1) clock enable propagation where a clock enable signal is propagated through the pipelined sequence along with data blocks to control whether each round circuit is active or inactive, and (2) control over an output bus and a data feedback bus for the pipelined sequence via a plurality of tri-state buffers, where each tri-state buffer holds an output from a round circuit and where a power control circuit drives the tri-state buffers via an enable signal that operates to selectively connect and disconnect the tri-state buffers to and from the output bus and the data feedback bus.

2. The apparatus of claim 1 wherein the round circuits comprise a plurality N of round circuits arranged in the pipelined sequence within the block cipher circuit; and wherein the block cipher circuit is configured to dynamically adjust how many of the N round circuits are active at a given time and thereby define a pipeline depth of simultaneously performed rounds of encryption for the pipelined sequence.

3. The apparatus of claim 2 wherein the block cipher circuit is further configured to disable a clock signal to a round circuit in the pipelined sequence to render that round circuit inactive within the pipelined sequence and thereby decrease the pipeline depth for the pipelined sequence.

4. The apparatus of claim 2 wherein the block cipher circuit further comprises:

a multiplexer circuit positioned upstream from an entry into the pipelined sequence, the multiplexer circuit configured to select between a new data input and a feedback data input for passage to the pipelined sequence; and wherein the pipelined sequence is configured with a feedback path from a plurality of the active round circuits to the multiplexer circuit, the feedback path thereby configured to provide the feedback data input to the multiplexer circuit.

5. The apparatus of claim 2 wherein the block cipher circuit is run-time scaled based on clock enable propagation where a clock enable signal is propagated through the pipelined sequence along with the data blocks to control whether each round circuit is enabled or disabled.

6. The apparatus of claim 5 wherein the block cipher circuit is configured to (1) encrypt a plurality of data blocks via the pipelined sequence and (2) propagate a clock enable signal along with the data blocks through the pipelined sequence, wherein each round circuit in the pipelined sequence is configured for activation or deactivation with respect to a round of encryption on a data block based on the propagated clock enable signal with which that data block is propagated.

7. The apparatus of claim 2 wherein the block cipher circuit is configured to selectively perform encryption or decryption of the data block via the same set of round circuits.

8. The apparatus of claim 7 wherein the pipelined sequence comprises:

an add round key stage as a first stage of the pipelined sequence; and a plurality of the round circuits of the pipelined sequence positioned downstream from the first stage, each of the plurality of round circuits comprising the same plurality of stages arranged in a variable processing order; and wherein the block cipher circuit is further configured to selectively control the processing order of the stages within the round circuits based on whether the round circuits are being used for encryption or decryption.

9. The apparatus of claim 8 wherein each round circuit comprises:

a byte substitution stage;

a row shifting stage downstream from the byte substitution stage;

an add round key stage downstream from the row shifting stage; and a column mixing stage downstream from the row shifting stage; and wherein the processing order of the add round key stage and the column mixing stage is variable such that, for a round circuit not serving as a final round for encryption or decryption of the data block, (1) the add round key stage has a processing order downstream from the column mixing stage when the round circuit is used for encryption, and (2) the column mixing stage has a processing order downstream from the add round key stage when the round circuit is used for decryption.

10. The apparatus of claim 7 wherein the pipelined sequence comprises:

an add round key stage as a first stage of the pipelined sequence; and a plurality of the round circuits of the pipelined sequence positioned downstream from the first stage, the plurality of round circuits being able to perform encryption or decryption without requiring instantiation of a plurality of column mixing stages or add round key stages within each round of the plurality of round circuits.

11. The apparatus of claim 1 wherein the block cipher circuit comprises a hardware logic circuit.

12. The apparatus of claim 11 wherein the hardware logic circuit comprises a reconfigurable logic device.

13. An apparatus comprising:

a key-based block cipher hardware logic circuit, the block cipher hardware logic circuit configured to encrypt a data block based on a key;

wherein the hardware logic block cipher circuit comprises a plurality of round circuits that are arranged in a pipelined sequence of operatively adjacent round circuits, the round circuits for simultaneously performing rounds of encryption;

wherein the block cipher hardware logic circuit is run-time scalable with respect to how many of the round circuits are active and how many passes through the round circuits are needed to encrypt a data block;

wherein the block cipher hardware logic circuit further comprises a multiplexer circuit positioned upstream from an entry into the pipelined sequence, the multiplexer circuit configured to select between a new data input and a feedback data input for passage to the pipelined sequence;

wherein the pipelined sequence is configured with a feedback path from a plurality of the active round circuits to the multiplexer circuit, the feedback path thereby configured to provide the feedback data input to the multiplexer circuit;

wherein the feedback path comprises a plurality of tri-state buffers, each tri-state buffer configured to receive input from an active round circuit in the pipelined sequence; and wherein the block cipher hardware logic circuit further comprises a control circuit configured to selectively enable the tri-state buffers at run-time to define a feedback characteristic for the pipelined sequence.

14. The apparatus of claim 13 wherein the feedback path comprises a data block feedback bus and a round key feedback bus.

15. The apparatus of claim 13 wherein the block cipher hardware logic circuit further comprises an output bus and a plurality of tri-state buffers configured to connect each active round circuit to the output bus; and wherein the control circuit is further configured to selectively enable the tri-state buffers interconnecting the output bus with the active round circuits to define which of the active round circuits serves as a final round of encryption that produces a cipher block output for the data block.

16. A method comprising:
    run-time scaling a key-based block cipher circuit, the block cipher circuit comprising a plurality of round circuits that are arranged in a pipelined sequence of operatively adjacent round circuits, the round circuits for simultaneously performing rounds of encryption, wherein the run-time scaling defines how many of the round circuits are active and how many passes through the round circuits are needed to encrypt or decrypt a data block;
    receiving a data block for encryption or decryption;
    receiving a key; and
    based on the key, encrypting or decrypting the data block via the active round circuits of the run-time scaled block cipher circuit; and
    wherein the run-time scaling is achieved via a member of the group consisting of (1) clock enable propagation where a clock enable signal is propagated through the pipelined sequence along with data blocks to control whether each round circuit is active or inactive, and (2) control over an output bus and a data feedback bus for the pipelined sequence via a plurality of tri-state buffers, where each tri-state buffer holds an output from a round circuit and where a power control circuit drives the tri-state buffers via an enable signal that operates to selectively connect and disconnect the tri-state buffers to and from the output bus and the data feedback bus.

17. The method of claim 16 wherein the round circuits comprise a plurality N of round circuits arranged in the pipelined sequence within the block cipher circuit; and
    wherein the run-time scaling step comprises the block cipher circuit dynamically adjusting how many of the N round circuits are active at a given time, thereby defining a pipeline depth of simultaneously performed rounds of encryption for the pipelined sequence.

18. The method of claim 17 wherein the run-timing scaling is achieved via the clock enable propagation, and wherein dynamically adjusting step comprises disabling a clock signal to a round circuit in the pipelined sequence via the clock enable signal that is propagated through the pipelined sequence along with data blocks to render that round circuit inactive within the pipelined sequence and thereby decrease the pipeline depth for the pipelined sequence.

19. The method of claim 17 wherein the run-time scaling step comprises run-time scaling the pipelined sequence based on clock enable propagation where a clock enable signal is propagated through the pipelined sequence along with the data blocks to control whether each round circuit is enabled or disabled.

20. The method of claim 17 wherein the encrypting or decrypting step comprises selectively performing encryption or decryption of the data block via the same set of round circuits.

21. The method of claim 20 wherein the pipelined sequence comprises:
    an add round key stage as a first stage of the pipelined sequence; and
    a plurality of the round circuits of the pipelined sequence positioned downstream from the first stage, each of the plurality of round circuits comprising the same plurality of stages arranged in a variable processing order; and
    wherein the method further comprises selectively controlling the processing order of the stages within the round circuits based on whether the round circuits are being used for encryption or decryption.

22. The method of claim 21 wherein each round circuit comprises:
    a byte substitution stage;
    a row shifting stage downstream from the byte substitution stage;
    an add round key stage downstream from the row shifting stage; and
    a column mixing stage downstream from the row shifting stage; and
    wherein the method further comprises varying the processing order of the add round key stage and the column mixing stage such that, for a round circuit not serving as a final round for encryption or decryption of the data block, (1) the add round key stage has a processing order downstream from the column mixing stage when the round circuit is used for encryption, and (2) the column mixing stage has a processing order downstream from the add round key stage when the round circuit is used for decryption.

23. The method of claim 20 wherein the pipelined sequence comprises:
    an add round key stage as a first stage of the pipelined sequence; and
    a plurality of the round circuits of the pipelined sequence positioned downstream from the first stage; and
    wherein the method further comprises the plurality of round circuits performing encryption or decryption without requiring instantiation of a plurality of column mixing stages or add round key stages within each round of the plurality of round circuits.

24. The method of claim 17 wherein the run-timing scaling is achieved via the control over an output bus and a data feedback bus for the pipelined sequence via tri-state buffers, and wherein the method further comprises:
    selecting between a new data input and a feedback data input for passage into the pipelined sequence;
    passing the selected new data input or feedback data input into the pipelined sequence;
    communicating feedback data from an active round circuit to the selecting step via the data feedback bus.

25. The method of claim 16 wherein the block cipher circuit comprises a hardware logic circuit.

26. The method of claim 25 wherein the hardware logic circuit comprises a reconfigurable logic device.

27. The method of claim 16 further comprising performing the method steps with respect to a plurality of streaming data blocks, wherein the run-time scaling step comprises propagating a clock enable signal along with the data blocks through the pipelined sequence, each round circuit being activated or deactivated with respect to performing a round of encryption on a data block based on the propagated clock enable signal with which that data block is propagated.

28. A method comprising:
    run-time scaling a key-based block cipher hardware logic circuit, the block cipher hardware logic circuit comprising a plurality N of round circuits that are arranged in a pipelined sequence of operatively adjacent round circuits within the block cipher hardware logic circuit, the round circuits for simultaneously performing rounds of encryption, wherein the run-time scaling defines how many of the round circuits are active and how many passes through the round circuits are needed to encrypt or decrypt a data block by the block cipher hardware logic circuit dynamically adjusting how many of the N round circuits are active at a given time, thereby defining a pipeline depth of simultaneously performed rounds of encryption for the pipelined sequence;

receiving a data block for encryption or decryption;
receiving a key;
selecting between a new data block input and a feedback data block input for passage into the pipelined sequence;
passing the selected new data block input or feedback data block input into the pipelined sequence;
based on the key, encrypting or decrypting the data block via the active round circuits of the run-time scaled block cipher circuit; and
communicating a feedback data block from an active round circuit to the selecting step via a feedback path, wherein the feedback path comprises a plurality of tri-state buffers, the method further comprising:
   a plurality of the tri-state buffers receiving input from a plurality of active round circuits in the pipelined sequence; and
   selectively enabling the tri-state buffers at run-time to define a feedback characteristic for the pipelined sequence.

29. The method of claim 28 wherein the communicating step comprises communicating data blocks to the selecting step via a data block feedback bus and communicating round keys to the selecting step via a round key feedback bus.

30. The method of claim 28 wherein the block cipher hardware logic circuit further comprises an output bus and another plurality of tri-state buffers, the method further comprising:
   the another plurality of tri-state buffers connecting the active round circuits to the output bus; and
   selectively enabling the another plurality of tri-state buffers interconnecting the output bus with the active round circuits to define which of the active round circuits serves as a final round of encryption that produces a cipher block output for the data block.

31. A method comprising:
   streaming a plurality of data blocks through a key-based block cipher circuit, the block cipher circuit comprising a plurality of round circuits that are arranged in a pipelined sequence of operatively adjacent round circuits;
   run-time scaling the block cipher circuit by selectively enabling and disabling the round circuits within the pipelined sequence to define a desired pipeline depth for the pipelined sequence, wherein the selectively enabling and disabling step comprises controlling whether a round circuit within the pipelined sequence is enabled or disabled via a member of the group consisting of (1) clock enable propagation where a clock enable signal is propagated through the pipelined sequence along with the data blocks to control whether each round circuit is enabled or disabled, and (2) control over an output bus and a data feedback bus for the pipelined sequence via a plurality of tri-state buffers, where each tri-state buffer holds an output from a round circuit and where a power control circuit drives the tri-state buffers via an enable signal that operates to selectively connect and disconnect the tri-state buffers to and from the output bus and the data feedback bus; and
   performing simultaneous rounds of key-based encryption or decryption on the streaming data blocks via each enabled round circuit of the pipelined sequence.

32. The method of claim 31 wherein the run-time scaling comprises:
   for a first plurality of the streaming data blocks, increasing the pipeline depth for the pipelined sequence by enabling an additional round circuit of the pipelined sequence.

33. The method of claim 32 wherein the increasing step comprises enabling a sufficient number of the round circuits to provide for full pipelining of the rounds of encryption or decryption on the first plurality of streaming data blocks.

34. The method of claim 32 wherein the increasing step causes an increase in throughput for the block cipher circuit.

35. The method of claim 32 wherein the run-time scaling further comprises:
   for a second plurality of the streaming data blocks, decreasing the pipeline depth for the pipelined sequence by disabling a formerly enabled round circuit of the pipelined sequence.

36. The method of claim 35 wherein the decreasing step causes a decrease in power consumption for the block cipher circuit.

37. The method of claim 31 wherein the run-time scaling further comprises:
   for a plurality of the streaming data blocks, decreasing the pipeline depth for the pipelined sequence by disabling a formerly enabled round circuit of the pipelined sequence.

38. The method of claim 31 wherein the block cipher circuit is implemented on a field programmable gate array (FPGA).

39. The method of claim 31 wherein the selectively enabling and disabling step comprises controlling whether a round circuit within the pipelined sequence is enabled or disabled via clock enable propagation where a clock enable signal is propagated through the pipelined sequence along with the data blocks to control whether each round circuit is enabled or disabled.

40. The method of claim 31 wherein the selectively enabling and disabling step comprises controlling whether a round circuit within the pipelined sequence is enabled or disabled via control over an output bus and a data feedback bus for the pipelined sequence via a plurality of tri-state buffers, where each tri-state buffer holds an output from a round circuit and where a power control circuit drives the tri-state buffers via an enable signal that operates to selectively connect and disconnect the tri-state buffers to and from the output bus and the data feedback bus.

41. The method of claim 40 wherein the pipelined sequence further comprises a round key feedback bus for the pipelined sequence and a plurality of additional tri-state buffers, where each additional tri-state buffer holds a round key output from a round circuit and where a power control circuit drives the additional tri-state buffers via another enable signal that operates to selectively connect the additional tri-state buffers to the round key feedback bus to control how round keys are fed back through the pipelined sequence.

* * * * *